US008949461B2

(12) United States Patent
Steele et al.

(10) Patent No.: US 8,949,461 B2
(45) Date of Patent: Feb. 3, 2015

(54) METHOD AND APPARATUS FOR PROVIDING CONTENT TO MEDIA DEVICES

(75) Inventors: Jay D. Steele, Waterloo (CA); Kenneth J. Whatmough, Toronto (CA); Shaun R. Johansen, Toronto (CA); Jon-David K. Lacey, Toronto (CA); Julian Paas, Mississauga (CA); Rakesh K. Arora, Toronto (CA); Laura Doktorova, Toronto (CA); John P. Hayman, Toronto (CA); Scott J. Hayman, Oakville (CA); Christopher D. Billard, Toronto (CA)

(73) Assignee: Blackberry Limited, Waterloo (CA)

( * ) Notice: Subject to any disclaimer, the term of this patent is extended or adjusted under 35 U.S.C. 154(b) by 1200 days.

(21) Appl. No.: 11/327,028

(22) Filed: Jan. 6, 2006

(65) Prior Publication Data

US 2006/0112167 A1 May 25, 2006

Related U.S. Application Data

(63) Continuation of application No. 10/472,652, filed as application No. PCT/CA02/00430 on Mar. 21, 2002, now abandoned.

(60) Provisional application No. 60/341,223, filed on Dec. 20, 2001.

(51) Int. Cl.
*G06F 15/16* (2006.01)
*H04L 29/06* (2006.01)
*H04L 29/08* (2006.01)

(52) U.S. Cl.
CPC .......... *H04L 65/4084* (2013.01); *H04L 67/289* (2013.01); *H04L 67/04* (2013.01);

(Continued)

(58) Field of Classification Search
CPC ...................................................... H04L 67/04
USPC ......................................... 709/246; 715/864
See application file for complete search history.

(56) References Cited

U.S. PATENT DOCUMENTS 6,212,550 B1 4/2001 Segur
6,232,988 B1 * 5/2001 Barlow et al. ................. 345/473

(Continued)

FOREIGN PATENT DOCUMENTS

DE 19962192 A1 7/2000
EP 0899924 7/1998

(Continued)

OTHER PUBLICATIONS

James S. Lipscomb et al., The HotMedia Architecture: Progressive and Interactive rich Media for the Internet, Jun. 2001, IEEE Transactions on Multimedia, vol. 3, No. 2, pp. 253-267.*

(Continued)

*Primary Examiner* — Esther Benoit
(74) *Attorney, Agent, or Firm* — Novak Druce Connolly Bove + Quigg LLP

(57) ABSTRACT

A method and apparatus for providing rich content to media devices are disclosed. Information content is converted at a content provider system for transmission to a media device over a wireless communication network. The converted content is processed by a media engine on the media device. The content is preferable converted at the content provider system into a binary format having separate visual elements and behavior elements.

23 Claims, 21 Drawing Sheets

(52) U.S. Cl.
CPC ......... *H04L29/06027* (2013.01); *H04L 69/329* (2013.01); *H04L 67/2823* (2013.01); *H04L 67/2819* (2013.01); *H04L 67/28* (2013.01); *H04L 29/06* (2013.01); *H04L 29/08846* (2013.01); *H04L 65/602* (2013.01)
USPC ...................................................... 709/246

(56) References Cited

U.S. PATENT DOCUMENTS

| | | | | |
|---|---|---|---|---|
| 6,285,889 | B1 | 9/2001 | Nykanen | |
| 6,356,543 | B2 | 3/2002 | Hall | |
| 6,388,688 | B1* | 5/2002 | Schileru-Key | 715/854 |
| 6,473,609 | B1 | 10/2002 | Schwartz | |
| 6,580,441 | B2* | 6/2003 | Schileru-Key | 715/805 |
| 6,741,242 | B1* | 5/2004 | Itoh et al. | 345/419 |
| 6,819,918 | B2 | 11/2004 | Chin | |
| 6,832,105 | B2* | 12/2004 | Okawa | 455/566 |
| 6,834,195 | B2 | 12/2004 | Brandenberg | |
| 6,848,004 | B1* | 1/2005 | Chang et al. | 709/232 |
| 6,880,123 | B1 | 4/2005 | Landsman | |
| 6,907,563 | B1* | 6/2005 | Kumar et al. | 715/207 |
| 7,016,963 | B1* | 3/2006 | Judd et al. | 709/228 |
| 7,203,758 | B2* | 4/2007 | Cook et al. | 709/231 |
| 7,500,017 | B2* | 3/2009 | Cseri et al. | 709/246 |
| 2002/0004804 | A1* | 1/2002 | Muenzel | 707/513 |
| 2002/0112078 | A1 | 8/2002 | Yach | |
| 2003/0098862 | A1* | 5/2003 | Hunt et al. | 345/418 |
| 2004/0017404 | A1* | 1/2004 | Schileru-Key | 345/854 |

FOREIGN PATENT DOCUMENTS

| | | |
|---|---|---|
| EP | 1107131 | 6/2001 |
| JP | 2000194612 | 7/2000 |
| JP | 2000222398 | 8/2000 |
| JP | 2001014246 | 1/2001 |
| RU | 2339175 | 11/2008 |
| RU | 2340106 | 11/2008 |
| WO | 0039666 | 7/2000 |
| WO | 0131497 A | 5/2001 |
| WO | 0190873 A | 11/2001 |
| WO | 02076058 A2 | 9/2002 |

OTHER PUBLICATIONS

Office Action mailed Mar. 16, 2006. In corresponding European application No. 02708102.5.
Office Action mailed Jul. 20, 2010. In corresponding Canadian application No. 2,441,612.
International Search Report mailed Jul. 11, 2003. In corresponding PCT application No. PCT/CA02/00430.
WEB Performance Management Solutions for wireless applications, Mercury Interactive: White Paper, 2000, pp. 1-17, XP002902534 p. 6-p. 7 p. 11 p. 13-p. 15; figures 2,3,8,11,12.
Engineering Animation: Worldup User's Guide—release 5, Engineering Animation, Online! Dec. 31-31, 2000, pp. 1-255, XP002245444. Retrieved from the internet : url:http://www.sense8.com/products/userguide.pdf. retrieved on Jun. 25, 2003. p. 23-p. 32; p. 45-p. 63; p. 70-p. 72; p. 121-p. 132; p. 149-p. 167 p. 195-p. 201.
Nat Pryce, Jeff Magee: SceneBeans: A Component-Based Animation Framework for Java Department of Computing , imperial Collegem Online! Feb. 14-14, 2000, pp. 1-11, XP002245445. http://www.dse.doc.ic.ac.uk/Software/Scene Beans/downloads/ Retrieved from the internet: url:http://www.-dse.doc.ic.ac.uk/Software/Scencebeans/downloads/scenebeans.pdf. retrieved on Jun. 25, 2003! p. 3-p. 8; figures 2,3.
Nokia WAP Toolkit 2.0 Nokia Product Data sheet, XX, XX Jun. 2000, pp. 1-2, XP002902533 the whole document.
Ericsson, Nokia: MMS Conformance Document Ericsson, Nokia, Online! Aug. 5-5, 2001, pp. 1-13, XP002245446, Retrieved from the Internet: Feb. 6, 2002.
Office Action mailed Aug. 20, 2008. In corresponding Canadian application No. 2,441,612.
Office Action mailed May 20, 2009. In corresponding Canadian application No. 2,441,612.
Notice of Allowance and Fee(S) Due mailed Oct. 23, 2009. In corresponding Mexican application No. PA/a/2003/008620.
Office Action mailed Feb. 26, 2008. In corresponding Japanese application No. 2002-573403.
Office Action mailed Sep. 9, 2005. In corresponding Chinese application No. 02810313.0.
Office Action mailed Aug. 15, 2008 . In corresponding Mexican application No. PA/a/2003/008620.
Final Office Action mailed Aug. 20, 2008. In corresponding Japanese application No. 2002-573403; English Translation.
Summons to attend oral proceedings pursuant to Rule 115 (1) EPC mailed Feb. 18, 2013, in corresponding European patent application No. 02708102.5.
Office Action mailed Jul. 22, 2013, in corresponding Canadian patent application No. 2,441,612.
Bowler, John et al.; "Scalable Vector Graphics (SVG) 1.0 Specification, W3C Proposed Recommendation Jul. 19, 2001," XP55050877, retrieved from the Internet: URL: http://www.w3.org/TR/2001/PR-SVG-20010719/PR-SVG-20010719.pdf.
Canadian Office Action mailed Dec. 14, 2012, in corresponding Canadian patent application No. 2,441,612.
Notice of Allowance and Issue Fee(s) mailed Jun. 3, 2013, in corresponding European patent application No. 02708102.5.

* cited by examiner

```
<?xml version="1.0"?>
<!DOCTYPE svg PUBLIC "-//W3C/DTD SVG 20010904//EN"
  "http://www.w3.org/TR/2001/REC-SVG-20010904/DTD/
svg10.dtd">

<svg width="120" height="130">

<!-- a white rectangle for the background color -->
  <rect x="0" y="0" width="120" height="130"
    fill="white"/>

<!-- a blue rectangle that moves from bottom to top -->
  <rect x="20" y="90" width="80" height="20"
    fill="blue">
    <animate attributeName="y"
      from="90"
      to="20"
      dur="2.0s"
      fill="freeze"/>
  </rect>

</svg>
```

BF file "sample.bf"     940

| Field Name | Type | Hex Value | Comment |
| --- | --- | --- | --- |
| BF start header | 4 bytes | D3 50 4D 45 | Identifies this file as BF |
| BF version | 4 bytes | 00 02 00 00 | BF version information |
| BF end header | 4 bytes | 0D 0A 20 0A | Used for detecting errors |
| Encoding | UTF-8 String | 00 04 53 4A 49 53 | "SJIS" |
| Scene title | UTF-8 String | 00 00 | "" (no title) |
| Copyright information | UTF-8 String | 00 00 | "" (no copyright information) |
| Unused | 7 bits | 0 | |
| Narrowing bytes – indices into object array | 1 bit | 0 | denotes unsigned 1 byte |
| Narrowing bytes – indices into coordinate array | 1 bit | 0 | denotes unsigned 1 byte |
| Narrowing bytes – length of variable data | 1 bit | 0 | denotes unsigned 1 byte |
| Narrowing bytes – loop count variables | 1 bit | 0 | denotes unsigned 1 byte |
| Narrowing bytes – scene/rectangle width and height | 1 bit | 0 | denotes unsigned 1 byte |
| Narrowing bytes – indices into key times array | 1 bit | 0 | denotes unsigned 1 byte |
| Narrowing bytes – indices into key values array | 1 bit | 0 | denotes unsigned 1 byte |
| Narrowing bytes – indices into channels array | 1 bit | 0 | denotes unsigned 1 byte |
| Narrowing bytes – key times | 2 bits | 1 | denotes unsigned 2 bytes |
| Narrowing bytes – key values | 3 bits | 0 | denotes unsigned 1 byte |
| Narrowing bytes – coordinate values | 3 bits | 0 | denotes unsigned 1 byte |
| Narrowing bytes – current child of group | 3 bits | 4 | denotes signed 1 byte |
| Narrowing bytes – x | 3 bits | 0 | denotes unsigned 1 |

FIG. 9 (continued)

| Narrowing bytes – x coordinate of a visual node | 3 bits | 0 | denotes unsigned 1 byte |
|---|---|---|---|
| Narrowing bytes – y coordinate of a visual node | 3 bits | 0 | denotes unsigned 1 byte |
| Scene width | 1 byte | 78 | 120 pixels |
| Scene height | 1 byte | 82 | 130 pixels |
| Background border color | 3 bytes | 00 00 00 | denotes black |
| Sequence root index | 2 bytes | 00 20 | the root node of the sequence graph is at index=32 of the nodes array |
| Node data size | 2 bytes | 00 2B | nodes array size=43 elements (at 4 bytes per element) |
| Key times data size | 2 bytes | 00 03 | key times array size=3 elements |
| Key values data size | 2 bytes | 00 03 | key values array size=3 elements |
| numCoordinateArrays | 1 byte | 00 | no coordinate arrays |
| numObjects | 1 byte | 00 | no objects |
| numSounds | 1 byte | 00 | no sounds |
| numImages | 1 byte | 00 | no images |
| numInterpolators | 2 bytes | 00 01 | number of interpolators=1 |
| numHotspots | 2 bytes | 00 00 | no hotspots |
| channel data size | 2 bytes | 00 00 | no channel data |
| checksum | 4 bytes | 00 00 82 4C | |
| nodes array element (index=0) | 9 bytes | 32 00 00 FE 02 00 08 00 14 | type=50 (visible group node) x=0 y=0 currentChild=ALL numChildren=2 child indices=8, 20 |
| nodes array element (index=8) | 9 bytes | 0A A0 00 00 FF FF FF 78 82 | type=10 (rectangle) visible=true hasStroke=false hasFill=true x=0 y=0 fill=rgb(255,255,255) (white) width=120 |

| nodes array element (index=20) | 9 bytes | 0A A0 14 5A 00 00 FF 50 14 | type=10 (rectangle) visible=true x=20 y=90 fill=rgb(0,0,255) (blue) width=80 height=20 |
|---|---|---|---|
| nodes array element (index=32) | 8 bytes | 55 01 14 00 00 01 00 17 | type=85 (interpolator) loopCount=1 type=LINEAR key times index=0 key values index=0 number of targets=1 target indices=23 (the y coordinate of the rectangle at index=20) |
| checksum | 4 bytes | 00 00 8A 38 | |
| checksum | 4 bytes | 00 00 8A 38 | |
| key times array | 3 bytes | 02 07 D0 | length=2 key times=0, 2000ms |
| checksum | 4 bytes | 00 00 92 0A | |
| key values array | 3 bytes | 02 5A 14 | length=2 key values=90, 20 |
| checksum | 4 bytes | 00 00 92 7A | |
| checksum | 4 bytes | 00 00 92 7A | |
| checksum | 4 bytes | 00 00 92 7A | |

METHOD AND APPARATUS FOR PROVIDING CONTENT TO MEDIA DEVICES

CROSS-REFERENCE TO RELATED APPLICATION(S)

This application is continuation of U.S. patent application entitled "METHOD AND APPARATUS FOR PROVIDING CONTENT TO MEDIA DEVICES" having Ser. No. 10/472,652, by Jay Steele, filed Sep. 19, 2003 and incorporated by reference herein.

U.S. patent application Ser. No. 10/472,652 is National Stage Entry of International Patent Application entitled "METHOD AND APPARATUS FOR PROVIDING CONTENT TO MEDIA DEVICES" having No. PCT/CA2002/000430, by Jay Steele, filed Mar. 21, 2002 and incorporated by reference herein.

International Patent Application No. PCT/CA2002/000430 is related to and claims priority to U.S. provisional application entitled "METHOD AND APPARATUS FOR PROVIDING RICH CONTENT TO MOBILE COMMUNICATION DEVICES" having Ser. No. 60/341,223, by Jay Steele, Chris Billard, Ken Whatmough, Shaun Johansen, and Jon-David Lacey, filed 20 Dec. 2001 and incorporated by reference herein.

BACKGROUND OF THE INVENTION

1. Field of the Invention

The present invention relates generally to the field of media devices, and in particular to providing so-called "rich content" to resource limited media devices.

2. Description of the State of the Art

There has been an explosion in the use of resource limited media devices, such as personal digital assistants (PDAs), cell phones, pagers, organizers, and wireless mobile devices. However, these media devices generally have very limited storage, processing power, and where applicable, communication bandwidth. For example, the NTT DoCoMo I-mode phones only have 10 kilobytes (kb) of flash memory for the storage of any one software application. With these limited resources, it is difficult to transfer, process, and render rich content, such as animated images, using existing text based browsers like the Internet Explorer™ browser.

A further complication with these media devices is their wide diversity even within a class from the same manufacturer. The differences may be great enough to force content developers to create tailored content for each model of device.

It is therefore desirable to provide a method and apparatus for providing rich content to media devices, which addresses, in part, some of the shortcomings of providing rich content to media devices noted above.

SUMMARY

According to an aspect of the present invention, there is provided a content provider system to connect to a network for communicating with media devices, comprising: a communication subsystem for communicating with the media devices over the network; an application connected to the communication subsystem for receiving requests for content from the media devices and, in response, retrieving requested content from a data store; and a converter connected to the application for formatting the requested content into a binary format so that the requested content in the binary format are sent to the media devices through the communication subsystem.

According to a further aspect of the present invention, there is provided a media device for connecting to a network to access a content provider system for content, the device comprising a device communication subsystem for communicating with the content provider system over the network; a device infrastructure having a display and a user interface for interacting with a user; and a media engine connected to the device communication subsystem and the device infrastructure for sending requests for content to the content provider system, and receiving requested content and, in response, rendering the requested content on the device infrastructure.

According to a further aspect of the present invention, there is provided a media engine for a media device connected to a network to access a content provider system for content where the media device comprises a device communication subsystem for communicating with the content provider system; and a device infrastructure having a display and a user interface for interacting with a user; and the media engine connected to the device communication subsystem and the device infrastructure; he media engine comprising a reader for receiving and reading the requested content, and placing the requested content in memory; and a render for rendering the requested content in memory on the device infrastructure.

According to a further aspect of the present invention, there is provided a simulation system for verifying content before deployment on a content provider system, the content provider system provides the content to media devices over a network, the simulation system comprising a plurality of device simulators where each of the device simulators emulates a type of media device; a converter for formatting the content into a binary format; and a media engine for rendering the content in the binary format on each of the device simulators.

According to a further aspect of the present invention, there is provided a method of rendering content on a media device, the media device having memory, comprising receiving the content where the content comprises visual elements represented by a visual graph and behavior elements represented by a sequence graph; reading the content and placing the content in the memory of the media device for rendering; rendering of the visual graph; rendering of the sequence graph and changing the visual graph according to the rendering of the sequence graph; and determining whether the rendering of the sequence graph has finished where if finished then end and where if not finished then go to the rendering of the visual graph and continue from the rendering of the visual graph.

According to a further aspect of the present invention, there is provided a method of accessing a content provider system for content from a media device having memory; the method comprising sending requests for content to the content provider system; receiving requested content in a binary format; reading the requested content, and placing the requested content in the memory of the media; and rendering the requested content on the media device.

BRIEF DESCRIPTION OF THE DRAWINGS

The present invention will be described in detail with reference to the accompanying drawings, in which like numerals denote like parts, and in which.

DETAILED DESCRIPTION

Figure 1:
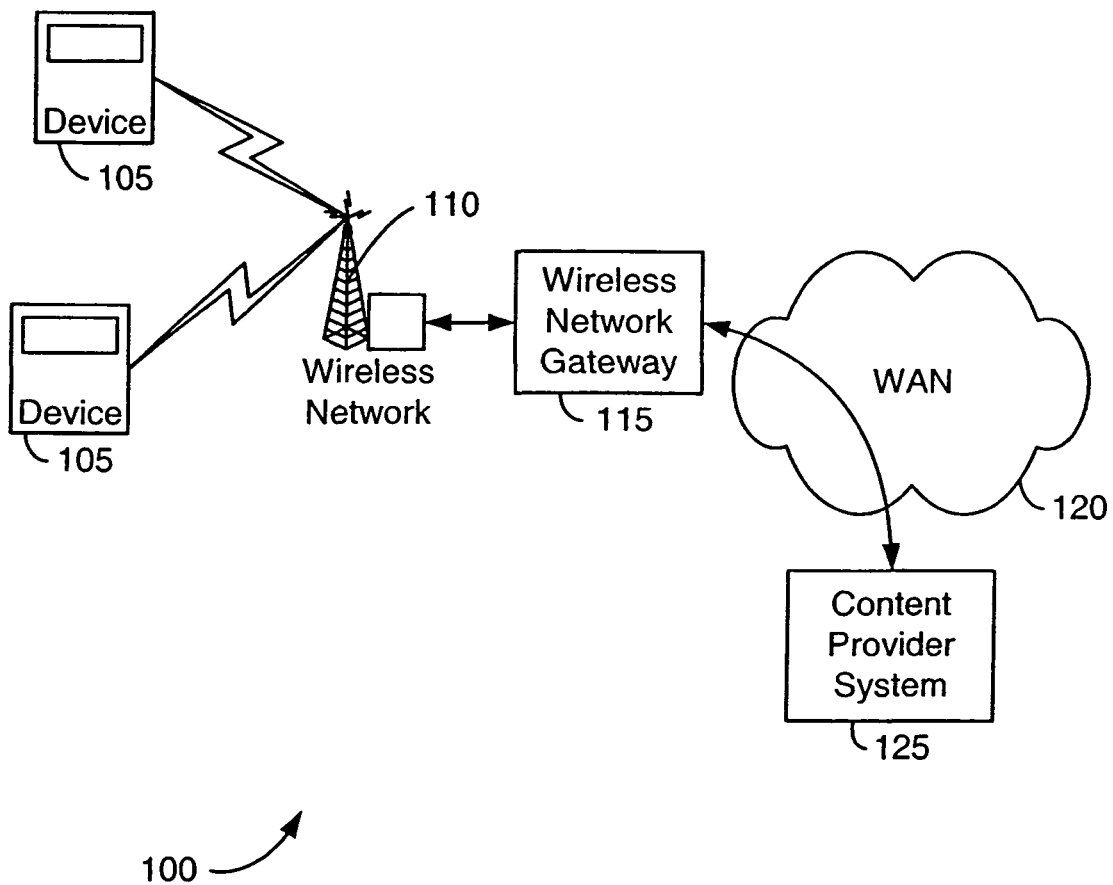
FIG. 1 is a block diagram of a Communication System with a Content Provider System in accordance with an embodiment of the present invention.

Referring to FIG. 1, there is a block diagram of a Communication System 100 with a Content Provider System 125 in accordance with an embodiment of the present invention. The Communication System 100 comprises Media Devices 105 for presenting content, a Wireless Network 110 for communicating with the Media Devices 105, a Wireless Network Gateway 115 for interfacing the Wireless Network 110 with a Wide Area Network (WAN) 120; the WAN 120 for connecting between the Wireless Network Gateway 115 with the Content Provider System 125; and the Content Provider System 125 for providing the content.

The Wireless Network Gateway 115 provides an interface between the Wireless Network 110 in which the Devices 105 operate, and the WAN 120 in which the Content Provider System 125 is configured to operate. The WAN 120 comprises the Internet, a direct connection, a local area network (LAN), a wireless communication link, and any combinations thereof.

The Content Provider System 125 provides the content for presentation on the Media Devices 105. The content is provided in a binary format for processing by the Media Devices 105. The binary format is substantially the content as it is to exist in-memory on the Media Devices 105 with a header. The content includes rich content.

The Media Devices 105 include, for example, data communication devices, multiple-mode communication devices configured for both data and voice communication, mobile telephones, mobile communication devices, PDAs enabled for wireless communications, 1-way or 2-way pagers, wireless modems operating in conjunction with computer systems, and any type of fixed or mobile wireless communication devices. Each of the Media Devices 105 is configured to operate within the Wireless Network 110. A receiver and transmitter subsystem or transceiver (not shown) is included within each of the Media Devices 105 for operation the Wireless Network 115. It should be appreciated however that the invention is in no way limited to these example types of devices and may be implemented in other devices with displays.

Alternately, the Content Provider System 125 may also provide content to any system connected to the WAN 120, including both wireless gateways as well as non-mobile systems such as desktop computer systems.

Figure 2:
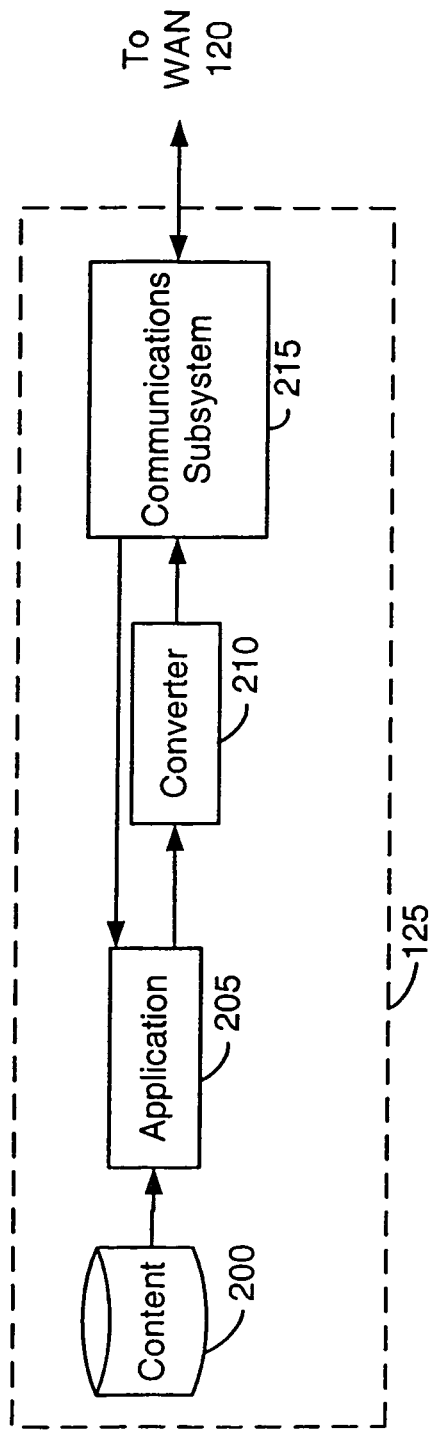
FIG. 2 is a block diagram of the Content Provider System of FIG. 1 which has a Converter.

Referring to FIG. 2, there is shown a block diagram of the Content Provider System 125 of FIG. 1. The Content Provider System 125 comprises a Data Store 200 for storing the content; an Application 205 to access and process the content for presenting on the Devices 105; a Converter 210 for converting the content into the binary format; and a Communication Subsystem 215 for sending the content in binary format.

The Data Store 200 stores the content on a hard disk of a server computer in which the Content Provider System 125 is implemented. The content is authored and stored in eXtensible Markup Language (XML) and, in particular, in Scalable Vector Graphics (SVG) format of XML for graphics including animated images. Alternately, the content stored in the Data Store 200 may be in any form, but the Application 205 the processes the retrieved content into a format suitable for the Converter 210.

The Application 205 comprises an application server. Alternately, the Application 205 may comprise an application executing on an application server. Alternately, the Application 205 may further comprise an application for a particular service executing on an application server.

The Converter 210 processes the content for rendering on the Devices 105. This processed content is provided in the binary format to further lessen processing at the Device 105. Thus, some of the content processing is offloaded from the Devices 105 to the Content Provider System 125.

The Devices 105 request content from the Content Provider System 125 via standard HTTP requests and, in response, the Content Provider System 125 provides the content in binary format to the Devices 105 where the content is displayed and content-related operations, including user inputs, are performed.

Alternatively, the Data Store 200 may be an external data store, including a web server for example, accessible to the Content Provider System 125 through a network or other connection.

Like the Gateway 115 and the Devices 105, the design of the Communication Subsystem 215 in the Content Provider System 125 depends upon the communication network(s) and protocol(s) used by the Content Provider System 125. The Communication Subsystem 215 includes such components as are required to communicate within the WAN 120. Those skilled in the art will appreciate that the Communication Subsystem 215 may also include systems for processing content requests, where content is provided in response to requests. The Communication Subsystem 215 may also include further or alternate systems and arrangements commonly associated with content provider systems.

Figure 3:
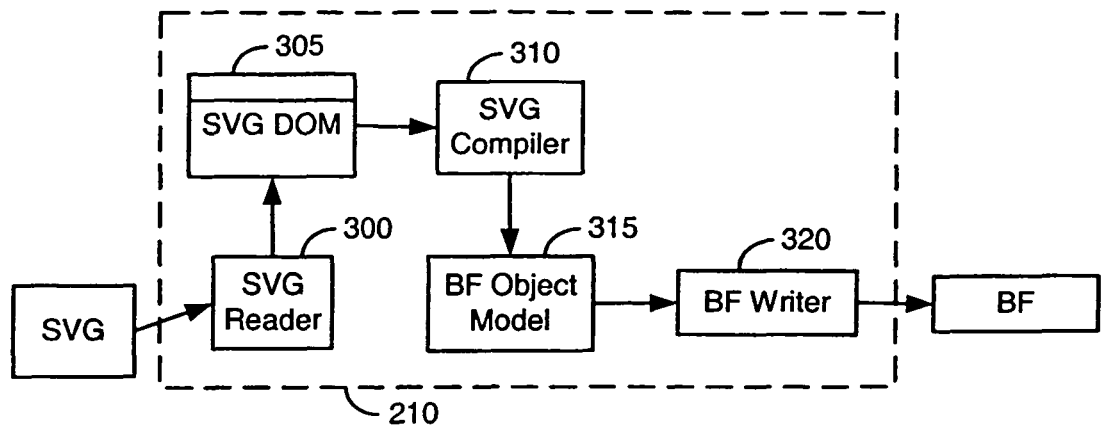
FIG. 3 is a block diagram of the Converter of FIG. 2, which has a SVG Compiler.

Referring to FIG. 3, there is shown a block diagram of the Converter 210 of FIG. 2. The Converter 210 comprises a SVG Reader 300 for reading the content in text XML with graphics in SVG and formatting the content into a SVG Document Object Model (SVG DOM) 305; a SVG Compiler 310 for converting the SVG DOM 305 to a BF Object Model 315; and a BF Writer 320 for writing the BF Object Model 315 of the content into the binary format.

The SVG DOM 305 is an in-memory version of the content for ready access by the SVG Compiler 310. The BF Object Model 315 is an in-memory version of the content as seen by renders on the Devices 105. The SVG Compiler 310 filters the SVG DOM 305 to discard elements of the DOM that are not supported by the BF Object Model 315 and then the filtered SVG DOM 305 is then analyzed and built into the BF Object Model 315. The binary format is substantially a memory map or dump of the BF Object Model 315 plus the header. An example of a specification of the binary format is listed in Table A. An example of SVG elements supported by the BF Object Model 315 is listed in Table B.

Figure 4:
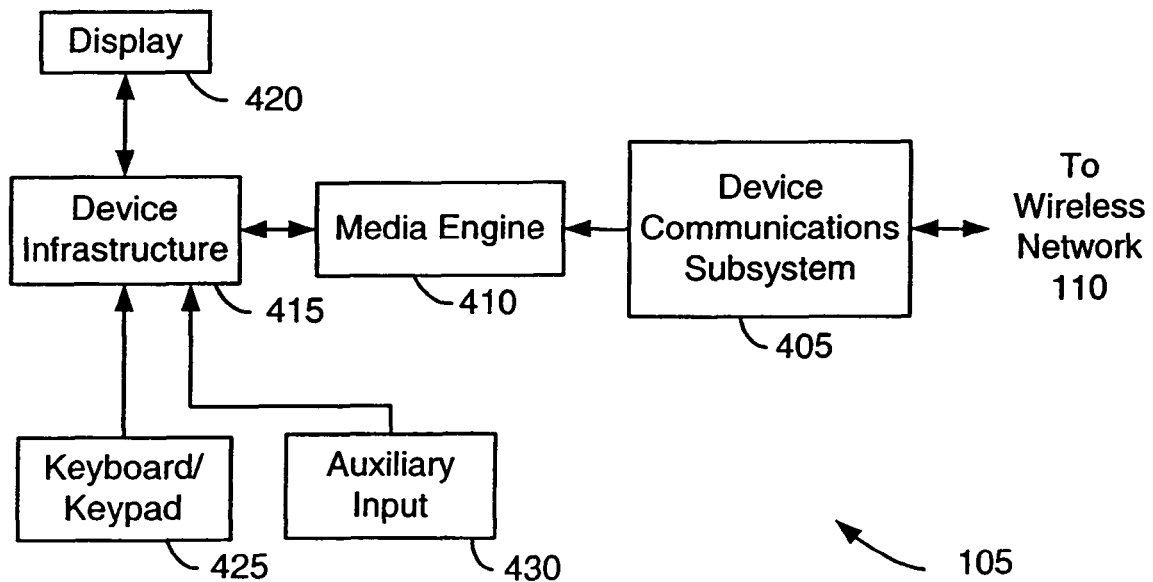
FIG. 4 is a block diagram of a Media Device of FIG. 1, which has a Media Engine.

Referring to FIG. 4, there is provided a block diagram of a Media Device 105 of FIG. 1, which has a Media Engine 410. The Media Device 105 comprises a Device Communication Subsystem 405 for interfacing the Device 105 with the Wireless Network 110 to receive the content and to send content related requests such as, user inputs; the Media Engine 410 for reading and rendering the received content including interpreting content related requests; a Device Infrastructure 415 with memory for supporting the operations of the Device 105; a Display 420 for presenting the content; and a Keyboard/Keypad 425 and an Auxiliary input device 430 for receiving the user inputs. The user inputs include requests for content from the Content Provider System 125. The Auxiliary input device 430 includes a rotatable thumbwheel, a special function key, and a pointer.

The Media Engine 410 preferably enables such rich content operations as image rendering, sprite animation rendering, filled and unfilled rectangle rendering, polygon, point, and polyline rendering, text rendering, and text font and style selection. Such advanced operations as constant, linear and cubic animation paths, animation of sprites, object positions and color, and audio clip rendering are also preferably supported by the Media Engine 410.

Figure 5:
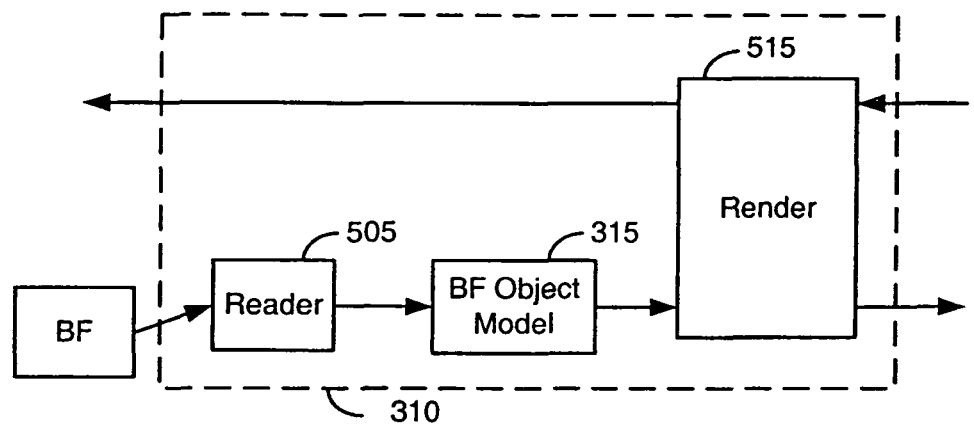
FIG. 5 is a block diagram of the Media Engine of FIG. 4.

Referring to FIG. 5, there is shown a block diagram of the Media Engine 410 of FIG. 4. The Media Engine 410 comprises a Reader 505 for reading the received content in binary format, formatting the received content to the BF Object Model 315 and placing in the memory of the Device 105; and a Render 515 to render the received content, the BF Object Model 315, for presenting on the Display 420 and for supporting content-related operations.

Figure 6:
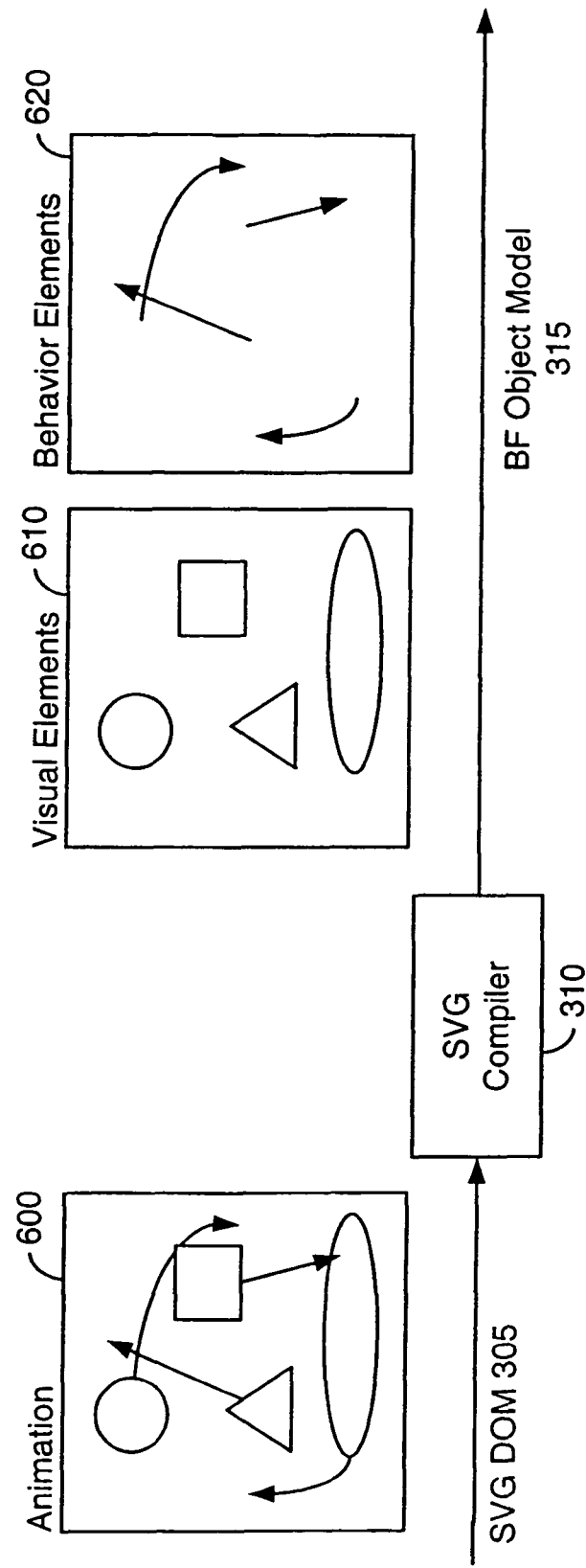
FIG. 6 is a block diagram of a conversion of an Animation by the SVG Compiler of FIG. 3, which conversion has Visual Elements and Behavior Elements.

Referring to FIG. 6, there is shown a block diagram of a conversion of an Animation 600 by the SVG Compiler 310 of FIG. 3. As those skilled in the art will appreciate, the Animation 600 in the SVG format has visual elements associated with behavior elements. The SVG Compiler 310 separates the Animation 600 into Visual Elements 610 and Behavior Elements 620, and builds the BF Object Model 315 with separate visual and behavior elements. The Visual Elements 610 include text, lines, colors, and shapes; whereas the Behavior Elements 620 include operations, such as, changing colors and changing positions of the Visual Elements 610 over time.

Figure 7:
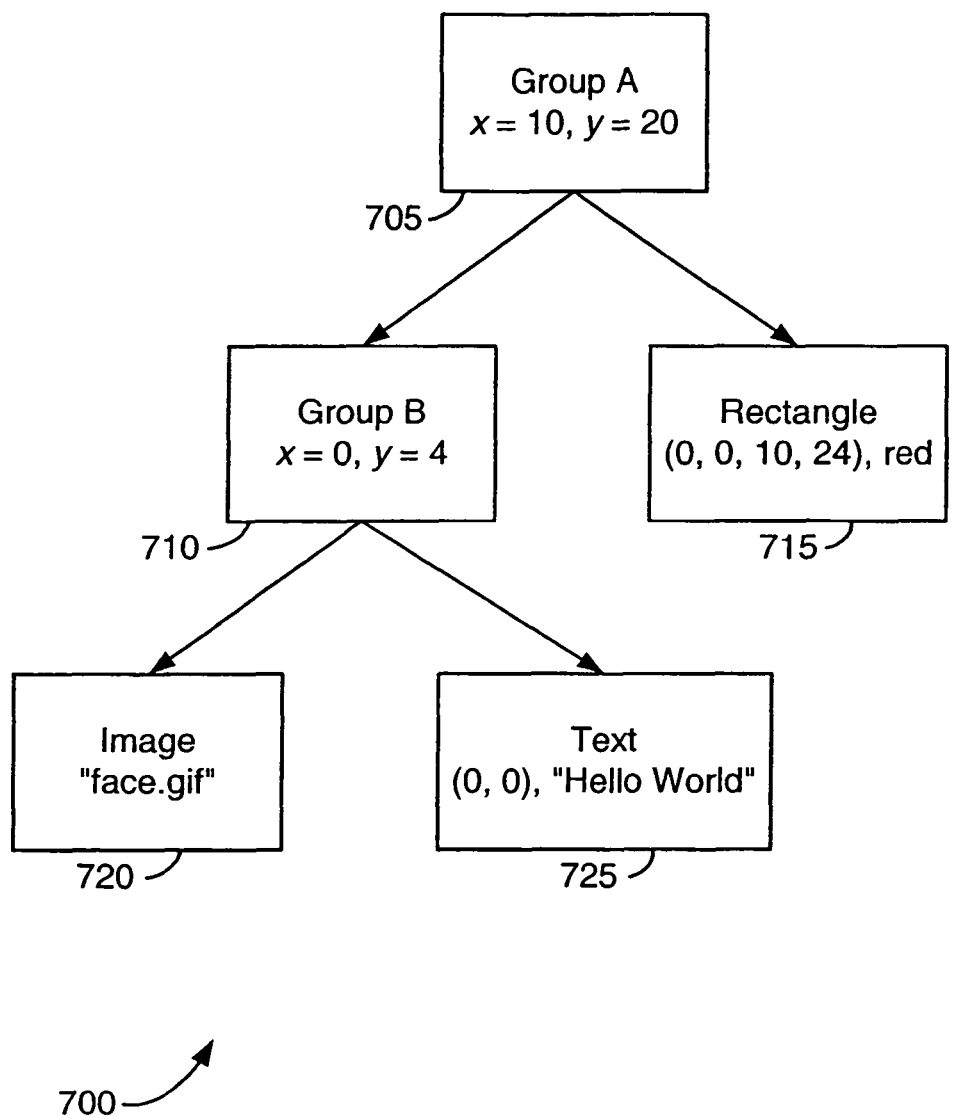
FIG. 7 is a block diagram of an example of the Visual Elements of FIG. 6 represented as a visual graph 700.

Referring to FIG. 7, there is shown a block diagram of an example of the Visual Elements 610 of FIG. 6 represented as a visual graph 700. The visual graph 700 is composed of nodes, including groups and leaves as shown. The visual graph 700 includes two groups—Group A 705 and Group B 710—and three leaves—Rectangle 715, Image 720, and Text 725. A group represents a transformed sub-universe, whereas leaves represent visual objects and attributes such as images, primitives (including lines, ellipses, and rectangles) and text.

The top level Group A 705 has two children, one of which is the Group B 710 and the other of which is a leaf, the Rectangle 715. The Group B 710 has two children of its own, each of them a leaf, namely the Image 720 and the Text 725. Grouping of nodes in a visual graph allows transformations, such as translations and rotations for example, to be applied to all elements of a group. The group nodes 705, 710 are also used to set graphics coordinates to be used when rendering visual elements in a group or subordinate group.

The Rectangle 715 is a primitive that is a rectangle with its top left corner at coordinates 0,0, a length of 10 pixels, a height of 24 pixels, and a color of red. The Image 720 is an image of a face in GIF format. The Text 725 is a text leaf with the text "Hello, World" starting at coordinates 0,0.

At the Device 105, the visual graph 700 is rendered by processing the nodes in a predetermined order, by starting at a root node and traversing leftmost nodes first (i.e. pre-order traversal). In the visual graph 700, the root node, the Group A 705, is processed first. The Group A 705 resets an origin of a graphics coordinate system for all elements in its sub-universe to coordinates x=10 and y=20. Therefore, all rendered components in the sub-universe of Group A 705 are drawn relative to the translated origin at 10,20.

Traversing the visual graph 700 in a pre-order traversal, the Group B 710, is processed next, which further translates the origin of the graphics coordinate system along a y axis. The visual elements in the sub-universe of Group B 710 are rendered relative to its origin at 10,24. The Image 720 is processed next and the image "face.gif" is displayed on the Display 420 at the Group B 710 origin of 10,24. Since the Image 720 is a leaf, the rendering process returns to the group node, the Group B 710, and then proceeds to the Text 725. The text "Hello, World" is then drawn starting at coordinates 0,0 in the sub-universe of the Group B 710, which is at absolute coordinates 10,24. The Text 725 is also a leaf, such that the rendering process returns to the group node, the Group B 710. Since all of the children of the Group B 710 have been processed, control then returns to the Group A 705 and graphical coordinates are reset to the sub-universe of the Group A 705, with origin at 10,20. The Rectangle 715 is then rendered to draw the red rectangle, at the origin of its sub-universe (10,20).

An algorithm, such as the SVG painter's model, is used to control the appearance of overlapping visual elements on a display screen. According to this algorithm, each visual element drawing operation "paints" over some area of an output device display screen. When this area overlaps a previously painted area, the new paint partially or completely obscures the old. Each visual element is drawn over any overlapping portions of previously drawn elements at the same location on the display screen. Therefore, background visual elements, which are to appear "deeper" in a displayed scene, are located in a visual graph so as to be drawn first, and foreground elements are drawn on top of previously drawn elements. In the visual graph 700, the red rectangle 715 is drawn on top of any overlapping sections of the previously drawn "face.gif" image 720 and the text "Hello, World" 725.

The visual graph 700 is an example of a visual graph and is intended for illustrative purposes only. The structure and arrangement of any visual graph will depend upon the visual elements in a scene to be displayed. Different elements than those shown in FIG. 7 may have further or different attributes. For example, an ellipse may be defined by its center location and the lengths of its major and minor axes, instead of the corner location, width and height shown for the rectangle in leaf 715. It is also contemplated that a rectangle or other shape may include further or alternative attributes than those shown in leaf 715, such as a different corner or center location instead of top left corner coordinates, fill properties, and line type designations. Similarly, text visual elements may have such attributes as font, color, and size.

Figure 8:
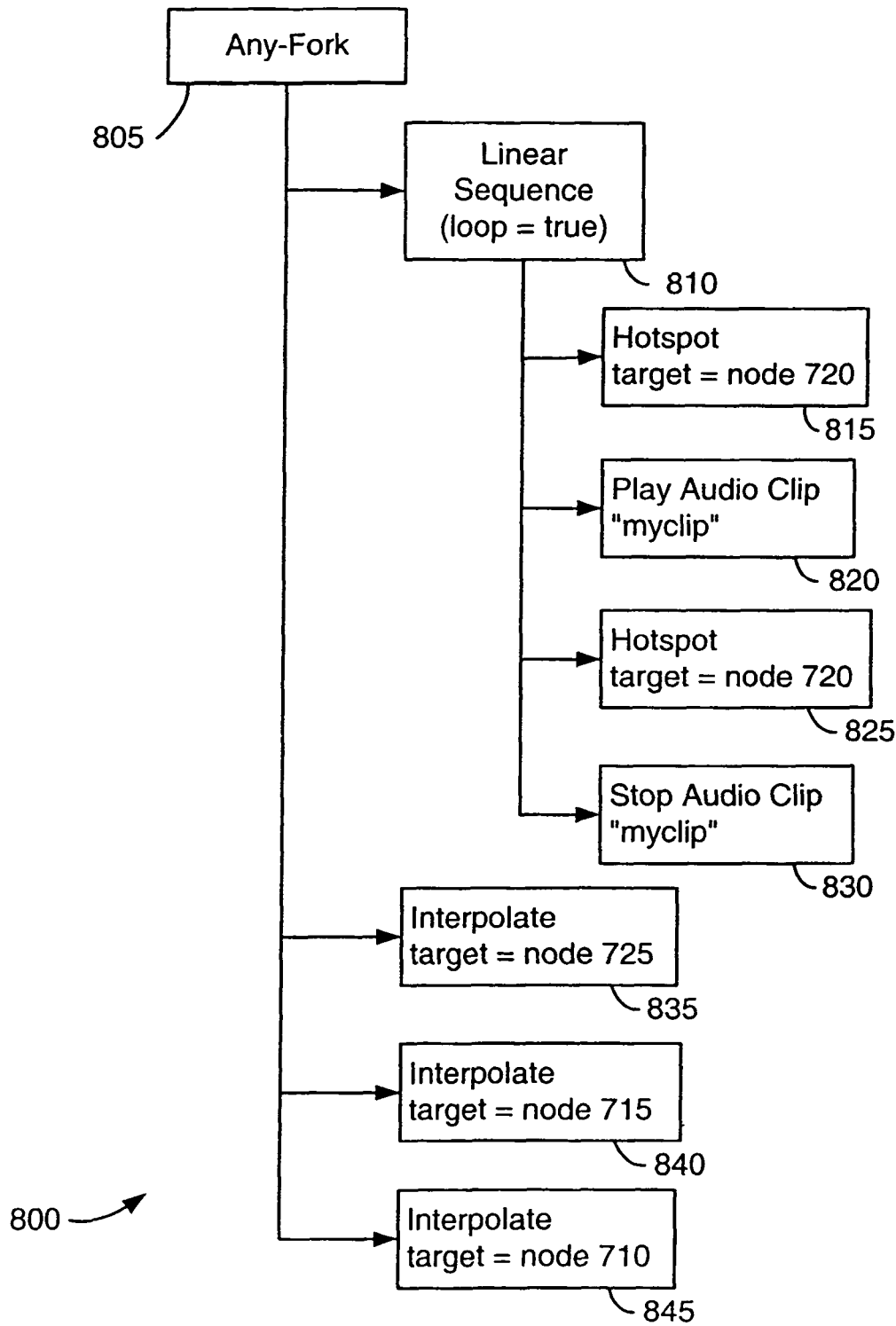
FIG. 8 is a block diagram of an example of the Behavior Elements of FIG. 6 represented as a sequence graph.

Referring to FIG. 8, there is shown a block diagram of an example of the Behavior Elements 620 of FIG. 6 represented as a Sequence Graph 800. The Sequence Graph 800 is based on the premise that the Visual Elements 610 have time based behaviors. These time based behaviors are used to construct behaviors that are used to both schedule the Animation 600 and make it behave as intended. The Behavior Elements 620 reference the Visual Elements 610 as necessary to apply the appropriate behaviors to create the Animation 600.

It will be apparent to those skilled in the art that the Animation 600 in SVG format requires a scheduler in order to manage the behaviors of visual elements. Separation of the Behavior Elements 620 in the Sequence Graph 800 from the Visual Elements 610 in the visual graph 700 in accordance with this aspect of the invention does not need a separate scheduler to process the Animation 600. Scheduling is inherent in the Sequence Graph 800, which reduces the requirements of the Media Engine 310 and further provides a method of provide thread-safe converted content.

The Sequence Graph 800 describes how a scene behaves over time and uses an inherent behavior scheduling metaphor. The sequence graph consists of behaviors and behavior sequencers. Behaviors include such operations as hotspots, hyperlinks, keypad events, text entry, animation/interpolation, timers, variable settings, play/stop audio, visual graph modification, and other behaviors. The behaviors are bounded by such behavior sequencers as linear sequences, all-fork, any-fork, and if-else-fork.

A hotspot is a special aggregated sensor/behavior that allows visual elements in the visual graph of a scene to be tagged as hotspots. This allows behaviors to be executed depending on the status of navigation of those hotspots using a cursor, pointer or the like on a device on which the scene is displayed. Hyperlinks are used to load more content from the network and are similarly dependent upon navigation and selection of a visual element on a display screen. Keypad events and text entry may also invoke other dependent behaviors.

Animation and interpolation are behaviors that apply to attribute data of various objects. An interpolation for example may define an interpolation curve along which one or more visual elements may be moved. Timers are used to set pauses of specified duration. Variable settings set the value of a variable or attribute. Play/Stop audio behavior provides for controlled playing of an audio clip. An audio clip may be played in its entirety, stopped after a predetermined time duration (using a timer for example), or stopped when a user navigates to a display screen hotspot for example.

Some of these behaviors affect visual elements of an animation. When a visual element is to be changed, the sequence graph references the appropriate element of the corresponding visual graph and modifies the element in the visual graph. The visual graph is then rendered again to reflect changes to visual elements.

A behavior sequencer controls the execution of its associated behaviors or "children" in a sequence graph. One such behavior sequencer is a linear sequence, in which each child is executed in order. A linear sequence is completed when all of its children have finished executing. Looping may be enabled or disabled in any linear sequence, and each child is executed during each pass of the loop. A loop in a linear sequence is complete when all children have finished executing, whereas an entire looped linear sequence is completed when all of its children have been executed a particular number of times specified in the linear sequence behavior sequencer in the sequence graph. If a linear sequence is to continue indefinitely, then infinite looping is specified.

Another behavior sequencer is referred to as an "all-fork" sequence. An all-fork sequence is completed when all of its children have finished executing. An "any-fork" sequence is similar in that it is completed when any of its children has finished executing. The all-fork and any-fork sequences emulate multi-threading for processing on resource-limited devices so that the spawning of more threads are more easily controlled.

An "if-else" sequence is a further behavior sequencer, which conditionally executes different one(s) of its children dependent upon the state of a sensor. For example, an if-else sequence having two children may execute one child when a sensor is active, i.e. a condition monitored by a sensor is detected, whereas the other child may be executed when the condition is not detected. The sensor function is abstract and may represent such device-related conditions as a key depression and/or release, and receipt of a communication signal.

Each sequencer may itself also be a parent and/or child of any other sequencer. Using combinations of behavior sequencers and behaviors, many different scene behaviors may be emulated by constructing a sequence graph based on original rich content.

However, the present invention is in no way limited to the above example behaviors and sequencers. Content converters and content providers may be configured to handle new behaviors and sequencers developed to support additional rich content functionality on devices.

Time based behaviors have a beginning and an end. A sequence graph is scheduled from an outermost behavior to one or more innermost behaviors and is run until the outermost behavior is finished.

The Sequence Graph 800 is representative of the timed operation of time based behaviors, with the outermost timed loop indicated by the top member of the graph. In this case an any-fork behavior sequencer 805 is the outermost behavior that controls the operation of this scene. Below any-fork block 805 is a loop represented by linear sequence 810 with the argument "loop=true", indicating that looping is enabled. This loop includes a hotspot 815, play audio clip 820, hotspot 825, and stop audio clip 830. In this loop, the activation of the hotspot at target node 720, the "face.gif" image (see the Visual Graph 700) by navigating a cursor or pointer over the hotspot causes an audio clip, designated "myclip" in FIG. 8, to play (controlled by block 820). The clip plays until the hotspot is engaged again by block 825, the hotspot may be toggled for example, at which time block 830 stops the audio clip.

The interpolate behaviors shown at blocks 835, 840, 845 translate their respective target objects by interpolating new object positions based on an interpolation curve and an elapsed time since the behavior was last executed. The interpolate behaviors 835, 840, 845 respectively move the visual elements at target node 725 (the text "Hello, World"), target node 715 (the rectangle) and target node 710 (the Group B 710, including both the image "face.gif" and the text "Hello, World").

The Visual Graph 700 and the Sequence Graph 800 are processed in a series of passes. In each pass, each of the elements in the graphs processed and processor time allotments are provided to each of the elements as needed by the elements.

This time allotment may be managed in a variety of ways, including for example sharing a predetermined single pass time between all behaviors in a sequence graph or allowing each behavior to complete a particular portion of its associated operations in each pass.

Alternately, a processor may also track execution times of each pass and possibly each behavior, such that time dependent behaviors may determine an elapsed time since its preceding pass, cumulative execution time (i.e. total elapsed time since the beginning of the first pass), and possibly other times associated with sequence graph processing, as required.

A first pass through the Sequence Graph 800, for example, proceed as follows. The outermost behavior sequencer, the any-fork sequencer 805 controls the completion of the sequence graph operations. As described above, an any-fork sequence is completed when any one of its children has finished executing. In the Sequence Graph 80, the linear sequence 810 is processed first. The first behavior, the hotspot 815, is allowed to execute to perform one or more particular functions.

Interpolate behaviors preferably have a specified total duration, such that associated translation operations are executed for a certain period of time before ending. The total duration typically is specified as a measure of time, but may instead be specified as a particular length along an interpolation curve, a number of cycles around a closed interpolation curve or some other type of limit controlling the execution of the behavior.

An interpolate behavior effectively calculates a new position for a target object based on an interpolation curve, an amount of time elapsed since a preceding pass through the behavior, and possibly a preferred animation "speed". For example, in the first pass through the Sequence Graph 800, the behavior 835 calculates a new position for the text "Hello, World" by interpolating a new position on an interpolation curve using an elapsed time since the beginning of the first pass through the sequence graph. An interpolate behavior effectively calculates a distance along the interpolation curve that the target object should have moved in the elapsed time and thereby determines new coordinates for the target object. In each pass through a sequence graph, the interpolate behavior 835 executes one interpolation calculation.

An interpolation curve may be of virtually any shape and size, depending upon the desired movements to be applied to a visual object. It should be appreciated that interpolation curves are used by interpolate behaviors but are not necessarily visual objects in a visual graph. Where one visual element is intended to move along a path that traces another visual element however, an interpolation curve may be established based on an element in a visual graph. In this case, an interpolate behavior may reference a non-target object in the visual graph to determine an interpolation curve to be used to control the behavior of another object, the target object, in the visual graph.

Each of the interpolate behaviors 835, 840, 845 may, for example, use a different type of interpolation curve for its respective target object. For example, behavior 835 may use a circular interpolation curve to move the text in a circular pattern, such as around the image "face.gif", whereas behavior 840 may animate the rectangle back and forth along a straight-line interpolation curve. Behavior 845 may then move both the text, which is moving around the image, and the image, in a rectangular pattern around the edges of a display screen.

Thus, in a first pass through the Sequence Graph 800, the hotspot behavior 815 establishes its target, the image, as a hotspot, and interpolate behaviors 835, 840, 845 all interpolate new positions for their respective targets and reference their targets in the Visual Graph 700 to move the Visual Elements 610 to their new positions on the Display 420 accordingly.

A second pass through the Sequence Graph 800 then begins. For the purposes of this example, it is assumed that none of the behaviors have finished executing in the first pass through the Sequence Graph 800. The any-fork sequencer 805 determines the status of its children by checking "finished" or similar flags or indicators, which are associated with and may preferably be set by each behavior. When a behavior finishes executing, it may set a finished flag to true, for example. In the Sequence Graph 800, the any-fork sequencer 805 ends processing of the sequence graph when any one of its children has set its completed flag.

In the second and subsequent passes through the Sequence Graph 800, each behavior resumes at whatever point it reached in the preceding pass. The linear sequence 810 is not yet complete, and resumes with the hotspot behavior 815 to determine if the user has navigated to or over the hotspot image. To this end, user inputs may be queued or cached in a memory on a device and processed during sequence graph operations.

The hotspot behavior 815 checks the input queue to determine if a user has navigated a cursor or other screen pointer over the hotspot. If so, the behavior 815 is finished and a finished flag is set to true to indicate to the linear sequencer 810 that it has completed and then the behavior 820 is started and a part of the audio clip "myclip" is played by the behavior 820.

As the hotspot has not been press again, for example, in this current pass, control then passes to the interpolate behaviors 835, 840, 845, which in turn determine new positions for their respective target objects for rendering.

In the next pass, the any-fork sequencer 805 again checks to see if any of its behaviors have finished and if so, the sequence is completed. Otherwise, another pass through the Sequence Graph 800 is performed. In this pass, the hotspot behavior 815 has finished, so the linear sequence 810 proceeds with behavior 820 to play another part of "myclip", and the hotspot target is established by behavior 84 within the execution time allotted to the linear sequence 810. New positions of targets 725, 715, 710 are determined, and the Visual Elements 610 are modified and rendered again.

Since looping is enabled in the linear sequence 810, the sequence repeat once all of its child behaviors have completed (i.e. when the user again navigates to the hotspot and the audio clip is stopped). Therefore, in the Sequence Graph 800, the any-fork sequence completes when one of the interpolate behaviors 835, 840, 845 finishes in a pass. In the next pass, the any-fork sequencer 805 detects the finished flag, or possibly otherwise determines that one of its children has finished executing, and the sequence graph processing ends.

The Visual Graph 700 and the Sequence Graph 800 are shown in FIGS. 7 and 8 for illustrative purposes only. An animation may include fewer, more and different visual elements in a visual graph and behaviors and sequencers in a sequence graph. This provides for flexibility in defining many different animations or scenes, which may include a multitude of effects and animations. The interpolate sequences represent only one example of effects that may be applied to visual elements in a visual graph. Any attributes of visual elements in a visual graph, including position, size and color for example, may be modified. Visual elements and groups in a visual graph may also preferably be moved in other ways than being translated along an interpolation curve. For example, target objects in a visual graph may also or instead be rotated. Many other effects could also be defined to emulate effects in original rich content, and are within the scope of the present invention.

Figure 9:
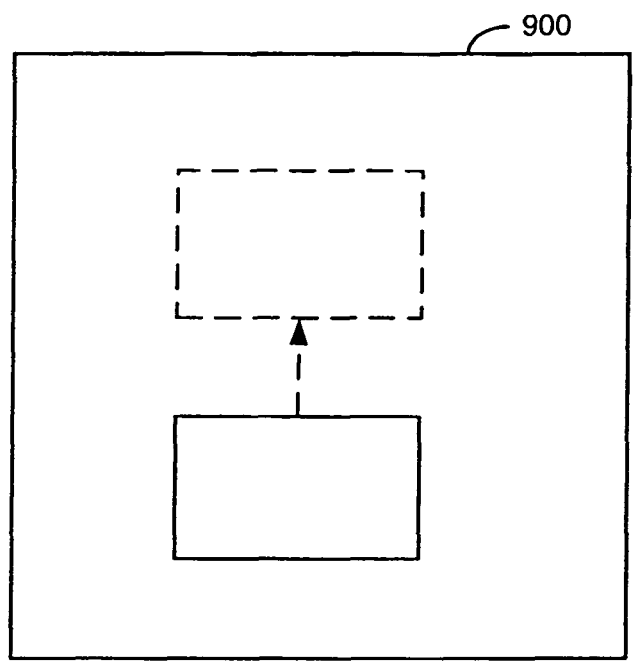
FIG. 9 is a block diagram of an example of a Square Animation.
Figure 9:
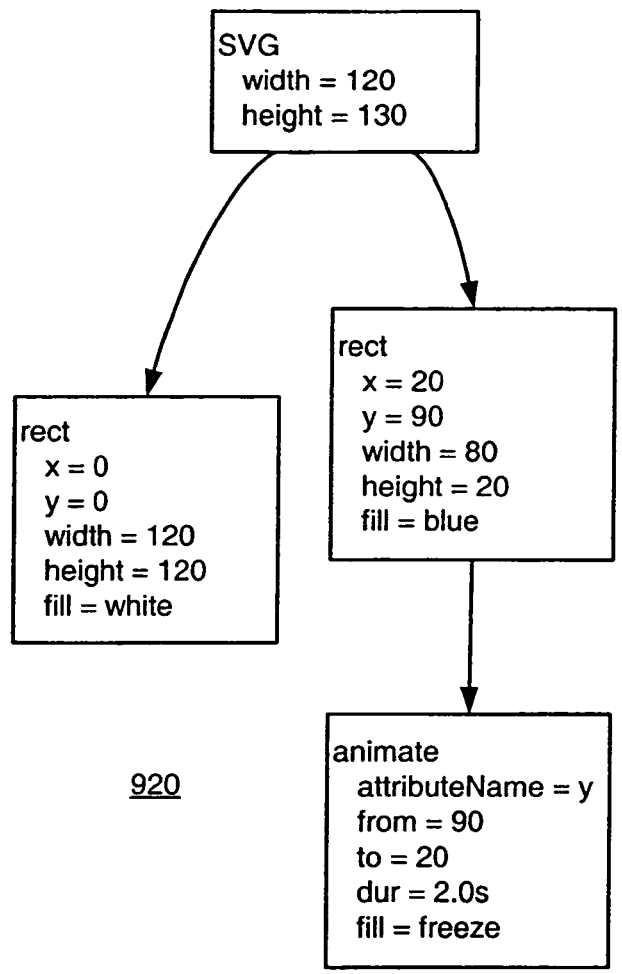
Figure 9:
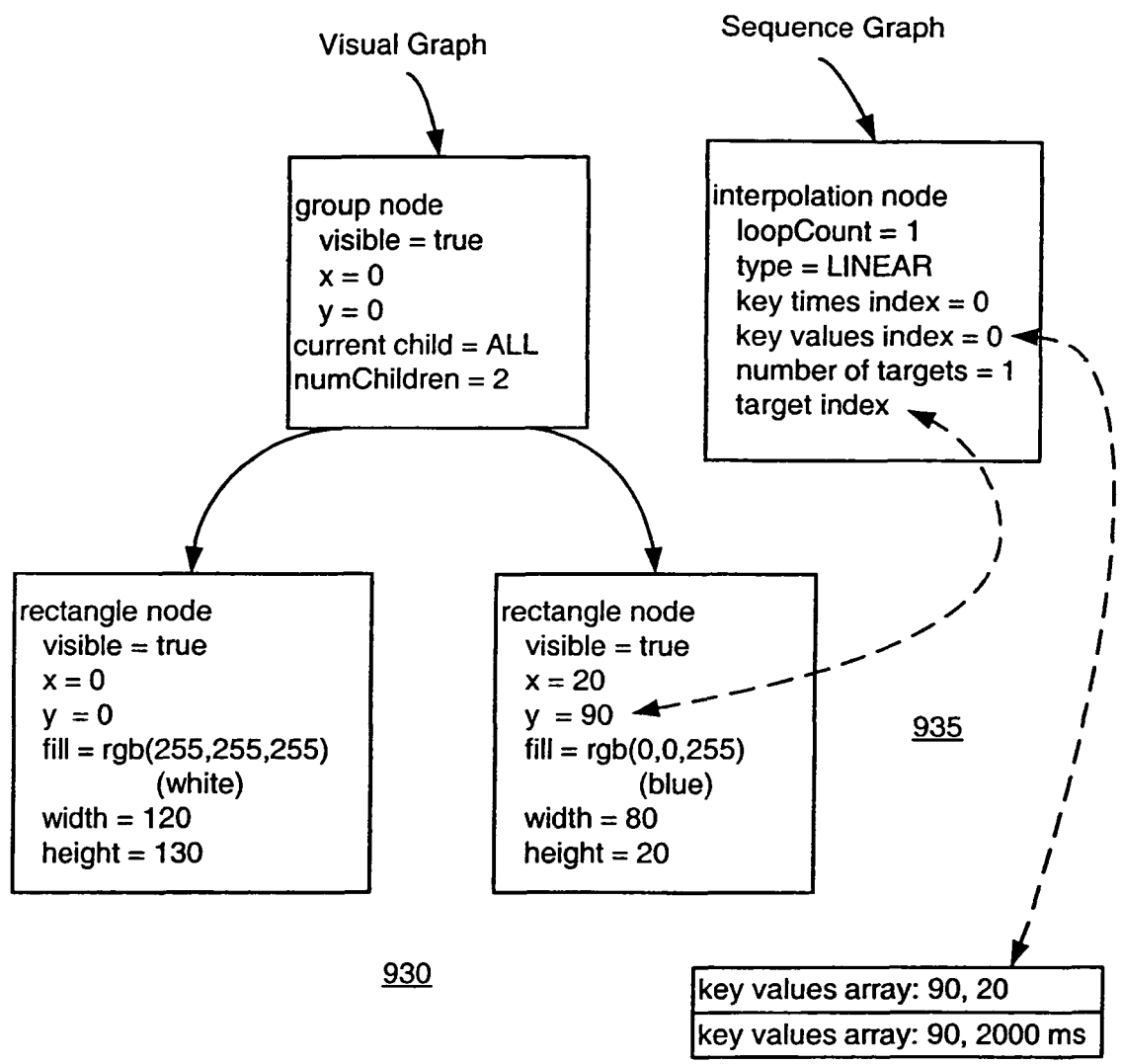

Referring to FIG. 9, there is shown a block diagram of an example of a Square Animation 900. The example of the Square Animation 900 is a blue square with a width of 80 and a height of 200 moving from coordinates X=20, Y=90 at time of 0 seconds to coordinates X=20, Y=20 at time of 2 seconds. In the Data Store 200, the Square Animation 900 is stored as square SVG 910 in the text format of SVG. The square SVG 910 is read by the SVG Reader 300 and is then stored in memory in the format of the SVG DOM 305, which is represented by a square SVG graph 920. The SVG Compiler 310 then converts the square SVG graph 920 to the BF Object Model 315, which is represented by a Square visual graph 930 and a Square sequence graph 935.

The Square visual graph 930 and the Square sequence graph 935 in memory are shown as square memory animation. The BF Writer 320 then writes the square memory animation into the binary format shown as Square binary 940. The Square binary 940 is substantially same as the square memory animation with a header. The Square binary 940 is sent to one of the Devices 105 for presentation. At the one of the Devices 105, the Reader 505 of Media Engine 310 reads the Square binary 940 and places in memory the Square Animation 900 as square device animation in the form of the BF Object Model 315 for rendering by the Render 515. The square device animation is substantially the same as the square memory animation.

For the Media Devices 105, the total time for an animation to be downloaded and processed on one of the Media Devices 105 is a combination of the time required to download the file of the Square binary 940 and of the process time required to process the file of the Square binary 940 into the square device animation in the form of the BF Object Model 315 for rendering by the Render 515. The total time may by optimized depending on the bandwidth available to download the file and the processing power available at the particular media device. Thus, the size of the file may be decreased by compression for a shorter download time in exchange for a longer process time. It will by understood by those skilled in the art that the total time may be reduced by compression and decompression in each case depends on the available bandwidth to the media devices and processing power of the media devices.

In accordance with a further embodiment of the present invention, the BF Writer 320 further compresses the BF Object Model 315 of the content when writing into the binary format and the Reader 505 further decompresses the received files in the binary format to generate the content into the BF Object Model 315 for rendering. The header of the binary format includes information on the compression such as the type and level of compression that has been applied. The methods of compression and decompression are known in the art.

Figure 10:
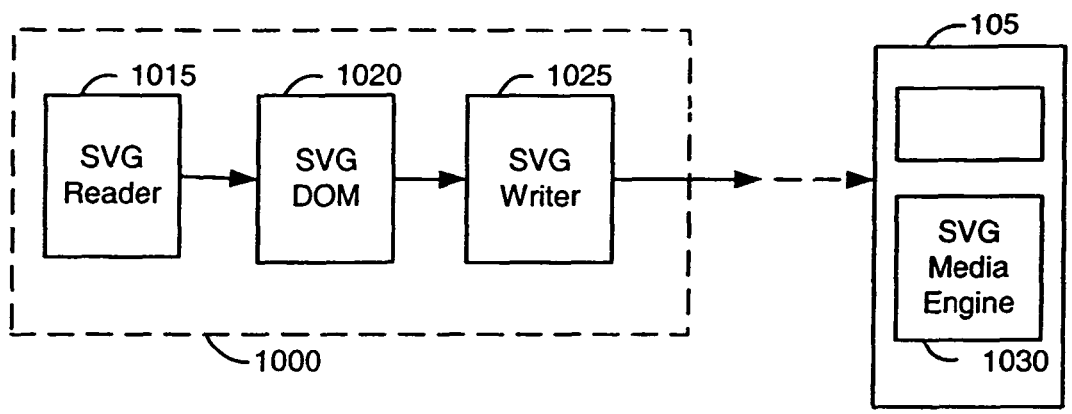
FIG. 10 is a block diagram of an Alternate Converter and a SVG Media Engine in accordance with another embodiment of the present invention.

Referring to FIG. 10, there is shown a block diagram of an Alternate Converter 1000 and a SVG Media Engine 1010 in accordance with another embodiment of the present invention. The Alternate Converter 1000 comprises the SVG Reader 1015 for reading the content in text XML with graphics in SVG and formatting the content into an alternate SVG DOM 1020, and a SVG Writer 1025 for writing the alternate SVG DOM 1015 into a SVG binary format. The alternate SVG DOM 1015 is an in-memory version of the content as seen by renders on the Devices 105. The SVG binary format is substantially the alternate SVG DOM 1015 with a header. The Alternate Media Engine 1010 reads the content in the SVG binary format and renders it accordingly.

In accordance with a further embodiment of the present invention, the in-memory versions of the content as seen by the renders on the Devices 105 are analogous to the in-memory versions of the content, the alternate SVG DOM 1020 and the BF Object Model 315, at the Content Provider System 125. It will be understood by those skilled in the art that, while it is preferable for the in-memory versions of the content at the Content Provider System 125 to be the same as the in-memory versions of the content as seen by the renders on the Devices 105, the in-memory versions of the content at the Content Provider System 125 may vary from the in-memory versions of the content as seen by the renders on the Devices 105.

Figure 11:
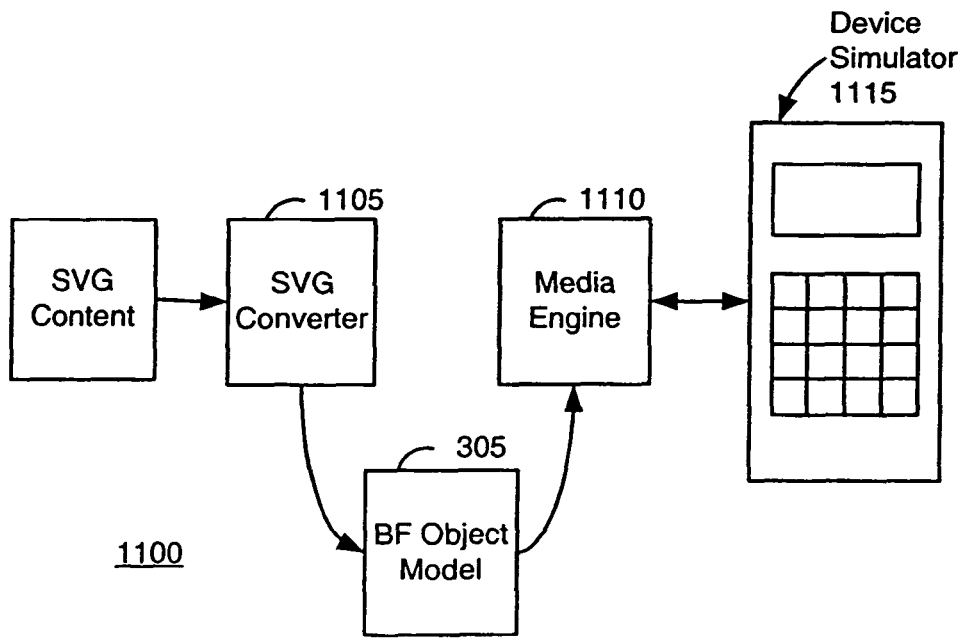
FIG. 11 is a block diagram of a Simulation System with a Device Simulator for verifying the content before deployment on the Content Provider System of FIG. 1.

Referring to FIG. 11, there is shown a block diagram of a Simulation System 1100 for verifying the content before deployment on the Content Provider System 125 of FIG. 1. The Simulation System 1100 comprises a SVG Converter 1105 for reading content created by developers in text format of XML and generating the BF Object Model 305 in-memory of the content, a Media Engine 1110 for accessing the BF Object Model 305 to render the content, and a Device Simulator 1115 to simulate a particular device for control by the Media Engine 1110 to present the content. The Device Simulator 1115 emulates the particular device with a display and a user interface. The Simulation System 1100 runs on a computer workstation over a Java Virtual Machine where the SVG Converter 1105, the Media Engine 1110, and Device Simulator 1115 are Java applications.

It will be appreciated that the Simulation System 1100, the SVG Converter 1105, the Media Engine 1110, and Device Simulator 1115 may be written in other computer programming languages.

Figure 12:
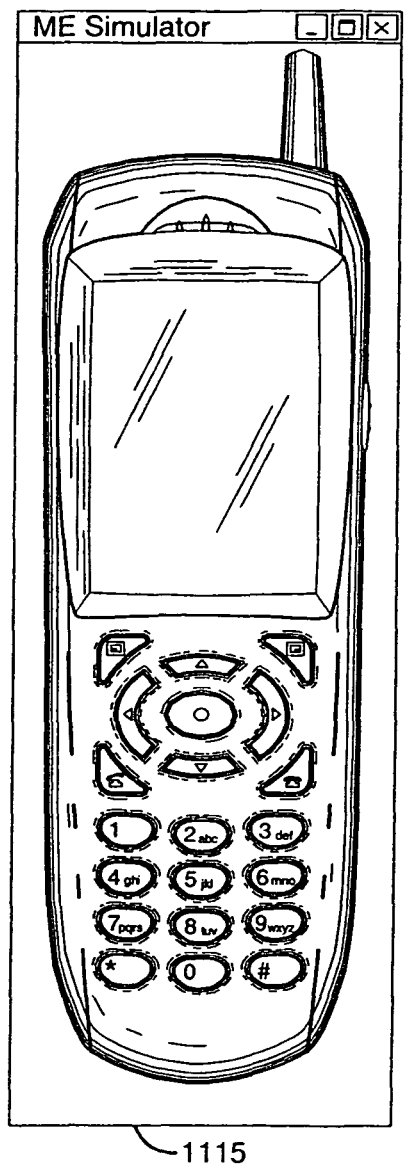
FIG. 12 is a screen shot of the Device Simulator for a NTT DoCoMo I-mode phone on a computer.

Referring to FIG. 12, there is shown a screen shot of the Device Simulator 115 for a NTT DoCoMo I-mode phone on a computer. Thus, the developers create the content formatted in text XML for an animation and the content is then tested by the Simulator System 1100 where the animation is played on the Device Simulator 1115. The developers also enter user inputs, where permitted by the content, on the user interface to complete the testing of the content.

The user interface comprises keyboard keys Arrow, Enter, Comma, and Period to interact with the phone in order to respectively navigate between hotspots, select the current hotspot, activate the left soft button, and activate the right soft button. The user interface further comprises a mouse to click the phone buttons arrow, middle, button under screen and number in order to respectively navigate between hotspots, select the current hotspot, activate a soft key, and activate corresponding menu item.

A device simulator may be created to emulate each of the available media devices to test the content before deployment. Alternatively, device simulators may also be created where one device simulator emulates a set of specifications that is common to a number of media devices. By using the Simulator System 1100, the developers may avoid testing the content on actual media devices, which may be a very large number given the wide variety of media devices.

Figure 13:
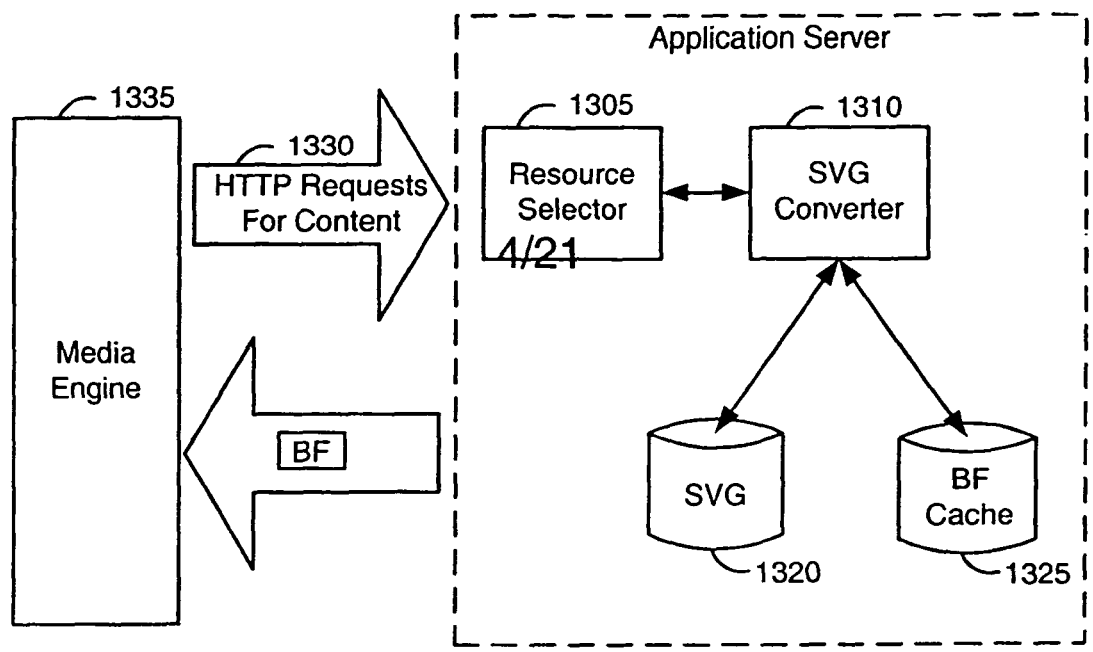
FIG. 13 is a block diagram of an Enhanced Content Provider System with a Resource Selector in accordance with a further embodiment of the present invention.

Referring to FIG. 13, there is shown a block diagram of an Enhanced Content Provider System 1300 with a Resource Selector 1305 in accordance with a further embodiment of the present invention. The Enhanced Content Provider System 1300 comprises the Resource Selector 1305, a SVG Converter 1310, a Properties Store 1315, a SVG Content Store 1320, and a BF Cache 1325. The Enhanced Content Provider System 1300 in response to HTTP Requests 1330 for content from Media Engines 1335, provides content files in the binary format.

The Media Engines 1335 provide the Enhanced Content Provider System 1300 with HTTP Requests 1330 that contain device identification information. The SVG Content Store 1320 contains SVG files of content where each file is associated with different resources such as image, sound, and SVG text files for difference device types. A resource includes a URL to an image, sound, SVG text, or other file. The Resource Selector 1305 redirects HTTP Requests 1330 for content to specific resources based on device context.

In response to a HTTP Request 1330, an incoming URL; the Resource Selector 1305 produces a mapped URL corresponding to the incoming URL based on the resource mapping specified in a configuration file. The configuration file has the address information to the resource files associated with the different devices types for each of the SVG files of content. The Resource Selector 1305 includes providing one-to-one mapping of the URLs for different devices, a default device where a device is not specified, and pattern-based rules of mapping URLs for different devices.

Alternately, the Resource Selector 1305 may maintain a list of adaptation rules for modifying the requested content based on the received device information. For example, if the display is larger than the content page, the Enhanced Content Provider System 1300 may either grow the content to fit the display or center the content in the display.

The pattern-based rules to organize the content based on device resources include (1) organize by content and sort by device where each subdirectory contains specific content then contains subdirectories for each supported device, for example, .../flowers/p503i/*.gif; (2) organize by device and sort by content where each subdirectory for each supported device then contains subdirectories for specific content, for example, .../p503i/flowers/*.gif; and (3) organize by naming convention where each file name identifies the corresponding device, for example, *_p503i.gif. The p503i is a device type.

The SVG Converter 1310 receives mapped URLs from the Resource Selector 1305 corresponding to the HTTP Requests 1330, and, in response, locates the SVG files and checks to determine if there are corresponding BF files of the content converted from the SVG files. If a converted BF file exists for a corresponding SVG file then the date stamps of both files are compared. If the date stamp of the BF file is the same or later than the corresponding SVG file then the BF file is retrieved from the BG Cache 1325 and sent to the Media Engine 1335 of the requesting media device without any conversion. If the date stamp of the BF file is earlier than the corresponding SVG file then the SVG Converter 1310 reconverts the corresponding SVG file, replaces the BF file in the older BF Cache 1325, and sends the BF file to the Media Engine 1335 of the requesting media device.

Each of the Media Engines 1335 further comprises a unique identifier. Embedded within each of the URLs sent by the Media Engines 1335 to the Enhanced Content Provider System 1300 is the unique identifier of the requesting Media Engine 1335. The unique identifiers may be used to implement personalization of an application such as, inserting a user's name into the SVG files before conversion by the SVG Converter 1310. The Media Engines 1335 with unique identifiers may be loaded into media devices by a number of methods as is known in the art.

The Media Engines 1335 with the unique identifiers may further be used to allow media devices to access the Internet without a permanently assigned IP address for each of the media devices. A media device with the Media Engine 1335 may access the Internet via Enhanced Content Provider System 1300 such that the Enhanced Content Provider System 1300 associates a dynamically assigned IP address with the unique identifier of the requesting media device. Thus, Internet sessions are supported on the requesting media device in that all URLs from the media device are sent to the Enhanced Content Provider System 1300 for retrieval of content over the Internet. The retrieved content is received by the Enhanced Content Provider System 1300 at the dynamically assigned IP address associated the unique identifier. Using the association, the retrieved content is then forward to the requesting media device. It is contemplated that the Enhanced Content Provider System 1300 may convert, process, and modify the retrieved content before forwarding it to the media device.

The Media Engine 1335 further implements pseudo-streaming where a first piece of content is loaded and played and while the first piece is being played, the Media Engine 1335 is instructed to fetch a second piece of content. Thus, when the first piece is completed, the second piece is loaded and begins playing. This technique continues with subsequent pieces to emulate continuous streaming.

Figure 14:
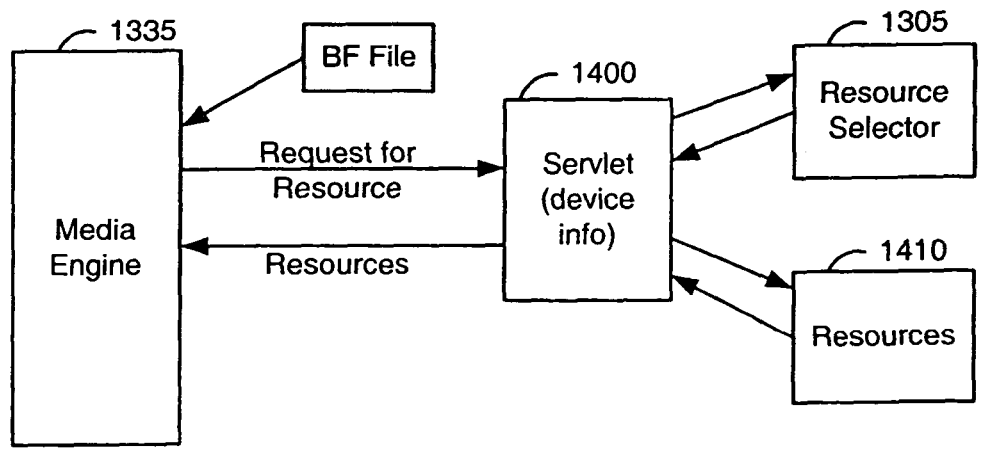
FIG. 14 is a block diagram of deployment strategies for the use of the Resource Selector of FIG. 13.

Referring to FIG. 14, there is shown a block diagram of deployment strategies for the use of the Resource Selector 1305 of FIG. 13. In a redirecting deployment strategy, the Media Engine 1335 of a particular media device downloads the BF file with the image and sound files. When the Media Engine 1335 (based on the content of the BF file) requires a particular image or sound file, it contacts a Servlet 1400 and provides the device information on the particular media device. The Resource Selector 1305 is then contacted, and based on the device information, the specific image and/or sound files are retrieved from Resources 1410 and sent back to the Media Engine 1335. The Resources 1410 comprises the SVG Converter 1310, the SVG Content Store 1320 and the BF Cache 1325.

In a rewriting deployment strategy, the Resource Selector 1335 is implemented before the BF file is downloaded. The Media Engine 1335 sends a request for resource to the Servlet 1400 with the device information of the particular media device. The Resource Selector 1305 then determines the appropriate image and sound files to include based on the device information. The SVG file with the appropriate image and sound files is then converted by the Resources 1410 to a BF file for download to the Media Engine 1335.

Figure 15:
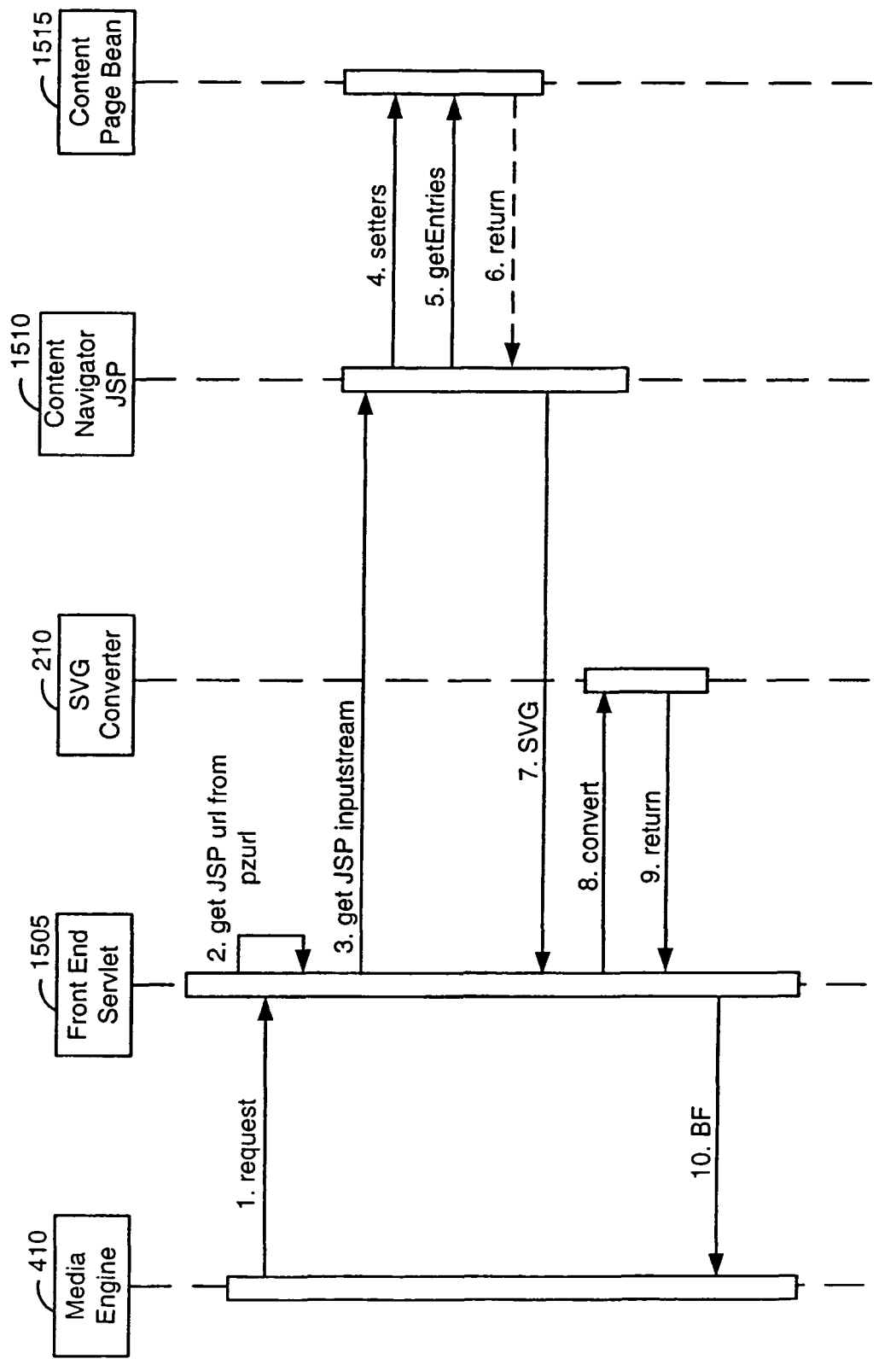
FIG. 15 is a sequence block diagram for a Content Navigator for generating an SVG representation of a specified file system for browsing and viewing from the Media Engine.

Referring to FIG. 15, there is shown a sequence block diagram for a Content Navigator 1500 for generating an SVG representation of a specified file system for browsing and viewing from the Media Engine 410. A request for content from a current directory is sent from the Media Engine 410 to a FrontEndServlet 1505. The URL of the JSP is retrieved from the query parameter within the request for content. The FrontEndServlet 1505 then sends a follow-up request for content under the current directory to a ContentNavigator JSP 1510. The properties in a ContentPageBean 1515 are then set. This adds the configuration information needed to create a content navigator page. The generated file list information of the current directory is the requested and returned by the ContentPageBean 1515. SVG code is then generated from the list information and returned to the FrontEndServlet 1505. The SVG code is then converted by the SVG Converter 210. The converted SVG code, a BF file, is returned to the FrontEndServlet 1505 in the binary format. The BF file with the file system is then sent to the Media Engine 410 for browsing and viewing.

Figure 16:
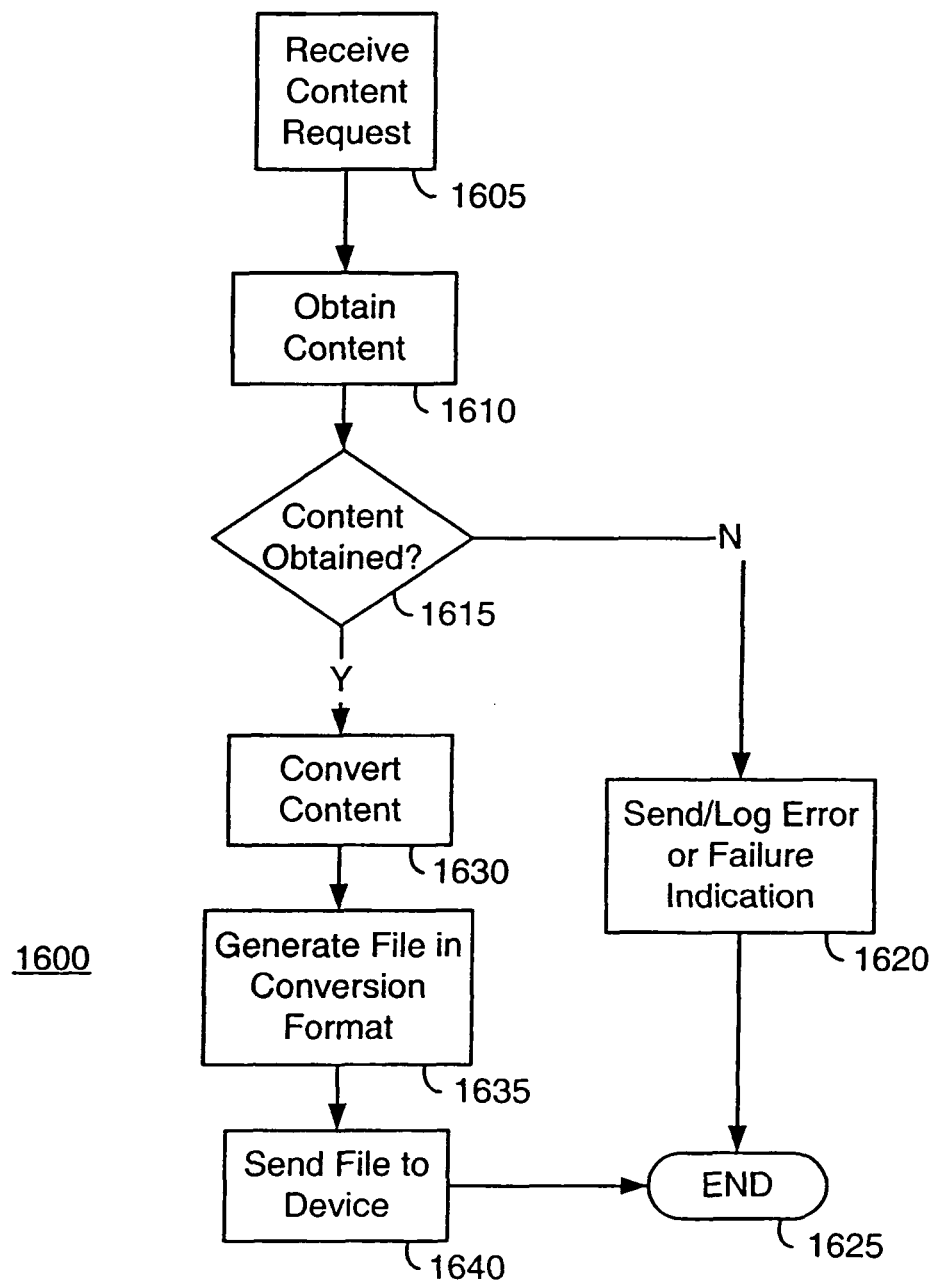
FIG. 16 is a flowchart of a Method of providing content to the Media Devices of FIG. 4.

Referring to FIG. 16, there is shown a flowchart of a Method 1600 of providing content to the Media Devices 105 of FIG. 4. In the Method 1600, the Content Provider System 125 receives a content request, for example an HTTP request, from the Media Device 105 (step 1605).

Although step 1605 refers to a content request, it is contemplated that the Content Provider System 125 may be configured to push content to a device without first having received a content request from the Media Device 105. For example, the Content Provider System 125 pushes certain content to the Media Device 105 at predefined intervals, at particular times of day, or when stored content changes. Step 1605 therefore is to be interpreted to include not only receiving a content request, but also triggers to generate content requests to push content to the Media Devices 105.

The Content Provider System 125 then obtains the content to be sent to the Media Device 105. The content may be stored locally at the Content Provider System 125, in the Data Store 200, or at a remote store on a web server on the Internet for example, that is accessible by the Content Provider System 125. The Content Provider System 125 then determines whether the content has been obtained (step 1615).

If the content has not been obtained by the Content Provider System 125 then an error or failure indication is sent to the Media Device 105 and the error or failure is logged for sequent review (step 1620). The processing of the request for content then ends (step 1625).

If the content is obtained then the content is converted into the SVG DOM 305 and then the BF Object Model 315 in the memory of the Content Provider System 125 (step 1630). The BF Object Model 315 is then formatted into the binary format, a BF file (step 1635). The Content Provider System 125 then sends the BF file to the Media Device 105 (step 1640). The operations for content conversion and transfer are the complete and processing ends (step 1625). These steps are repeated for each content request or alternatively for each content push request.

Alternately, the step 1610 to obtain content may further obtain content based on the device information of the Media Device 105 and may further modified the obtained content with personalization data on the user of the Media Device 105 in accordance with the Enhanced Content Provider System 1300.

Figure 17:
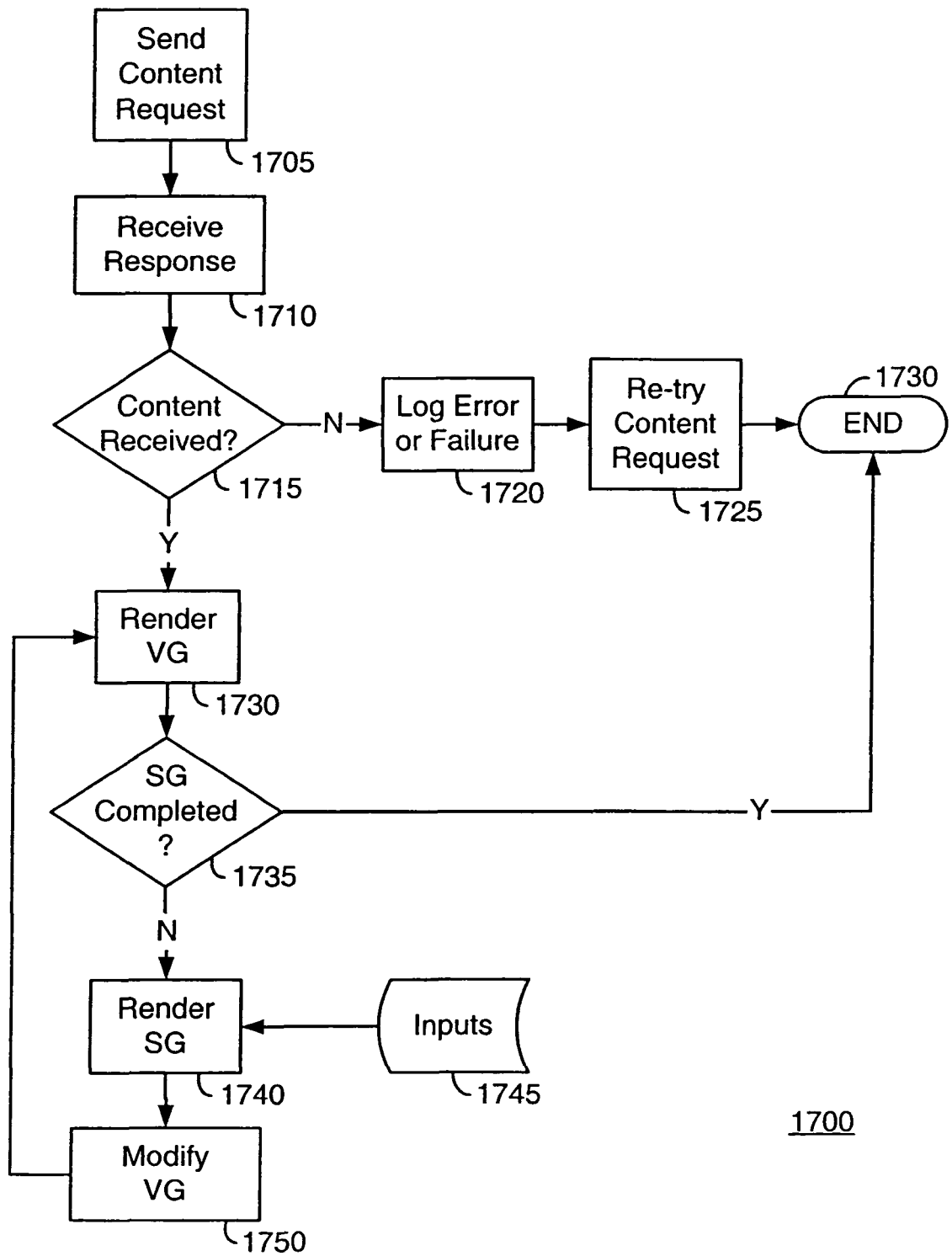
FIG. 17 is a flowchart of a method of processing content on the Media Device of FIG. 1.

Referring to FIG. 17, there is shown a flowchart of a method of processing content on the Media Device 105 of FIG. 1. The Media Device 105 sends a content request to the Content Provider System 125 (step 1705). The content request may be generated by a software application running on the Media Device 105, either in response to user input or automatically. An automatic content request is analogous to a content push operation from a user's perspective in that content is sent to the user without the user having made an explicit request for the content. In one embodiment, the request contains a uniform resource locator (URL), associated with a Content Provider System 125. In another embodiment, the request also contains session information such as display- and computer-specific data describing the Media Device 105. This information may include device display screen dimensions, color support availability and number of colors.

The Media Device 105 receives a response to the request from the Content Provider System 125 (step 1710). The Media Device 105 then determine if the communication from the Content Provider System 125 is actual content (step 1715). If a negative determination is made at step 1715, for example if the content provider has returned an error or failure indication to the Media Device 105, then the error or failure is indicated on the Media Device 105 (step 1720).

Alternately, the Media Device 105 may re-try the content request by sending the request to a different content provider system, depending for example on the nature of the error, failure, or other content-related problems (step 1725). The processing then ends (step 1730).

If actual content is received then the Media Device 105 processes the content by the Media Engine 410 rendering the visual elements of the contents (step 1730). The behavior elements of the contents are then processed. Firstly, the Media Engine 410 determines if the processing of the behavior elements have been completed (step 1735). If the behavior elements have been processed then the method is complete (step 1730).

The Media Engine 410 then processes through the behavior elements for one pass (step 1740) and further processing user inputs stored in an input queue where required by the content (1745). User inputs or user interactions are preferably collected and queued as they are made, which is a continuous process executing concurrently with content processing operations.

The visual elements are then modified where a behavior modifies attributes such as color, size, position and the like of a visual element (step 1750). Processing then returns to step 1730, where the modified visual graph is rendered.

A further aspect of the invention employs pseudo-streaming for content playback. The content to be played or displayed is divided into blocks of content. After the first block, containing a visual graph and part of a sequence graph, is transmitted to the Media Device 105, the Media Engine 410 begins display and while that block of the sequence graph is being processed, the next block, which may include new parts or behaviors for the sequence graph, a new visual graph or new visual elements for the visual graph, or some combination thereof, is fetched over the wireless network. This gives the impression of continuous streaming without the wireless network penalties of streaming.

It is also contemplated that such functionality may be incorporated into a sequence graph by defining behaviors that fetch further content from a Content Provider System 125 while the behavior elements are being executed. For example, a "fetch and replace" behavior is defined, which when executed fetches another behavior or combination of behaviors and behavior sequencers from a Content Provider System 125 and replaces itself with the fetched behavior or combination when a response to the request is received.

Figure 18:
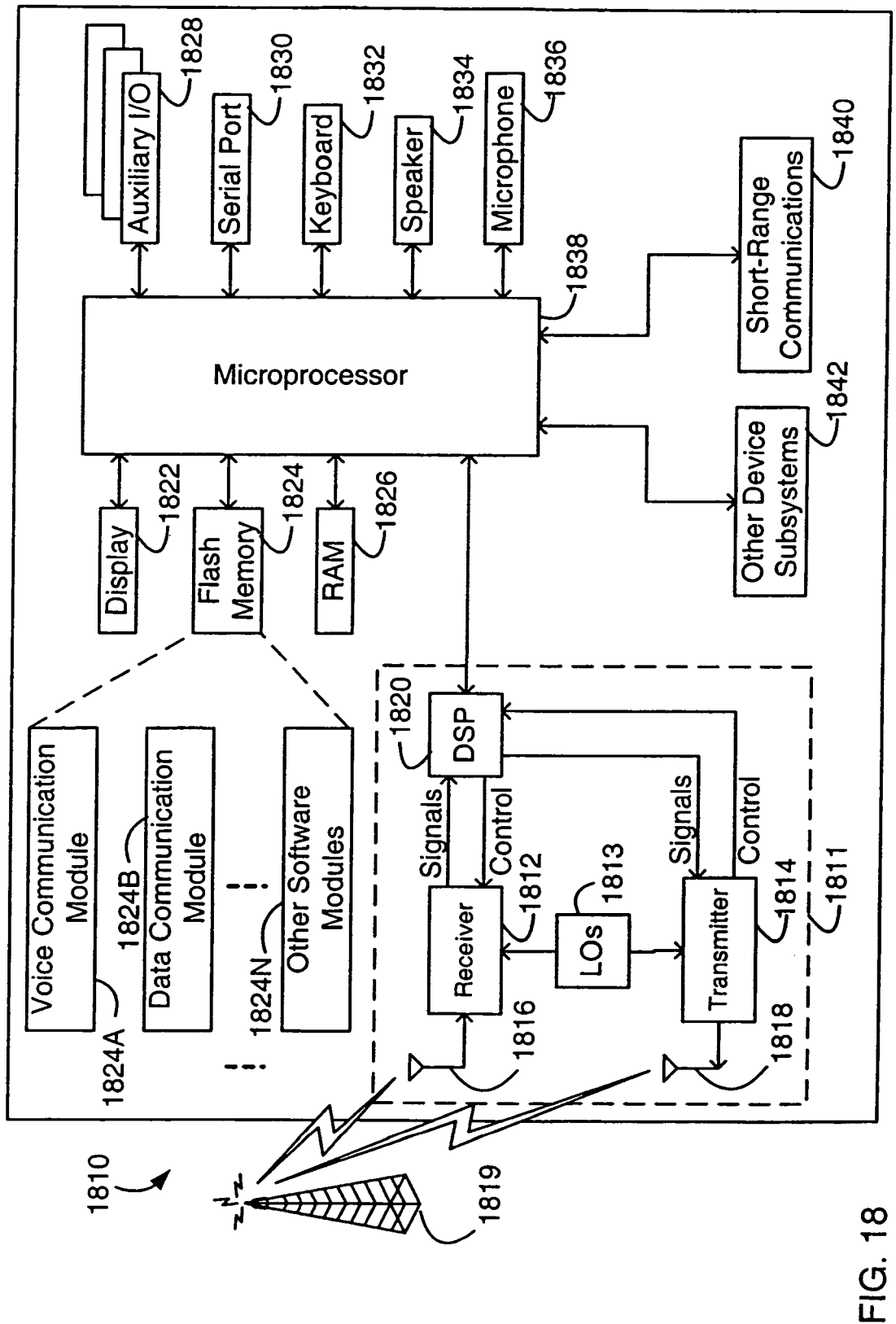
FIG. 18 is a block diagram of a dual-mode mobile communication device.

Referring to FIG. 18, there is shown a block diagram of a dual-mode mobile communication device 1810. The Media Devices 105, for example, include the dual-mode mobile communication device 1810.

The dual-mode device 1810 includes a transceiver 1811, a microprocessor 1838, a display 1822, Flash memory 1824, RAM memory 1826, auxiliary input/output (I/O) devices 1828, a serial port 1830, a keyboard 1832, a speaker 1834, a microphone 1836, a short-range wireless communications sub-system 1840, and may also include other device sub-systems 1842. The transceiver 1811 preferably includes transmit and receive antennas 1816, 1818, a receiver 1812, a transmitter 1814, one or more local oscillators 1813, and a digital signal processor 1820. Within the Flash memory 1824, the device 1810 preferably includes a plurality of software modules 1824A-1824N that can be executed by the microprocessor 1838 (and/or the DSP 1820), including a voice communication module 1824A, a data communication module 1824B, and a plurality of other operational modules 1824N for carrying out a plurality of other functions.

The mobile communication device 1810 is preferably a two-way communication device having voice and data communication capabilities. Thus, for example, the device may communicate over a voice network, such as any of the analog or digital cellular networks, and may also communicate over a data network. The voice and data networks are depicted in FIG. 18 by the communication tower 1819. These voice and data networks may be separate communication networks using separate infrastructure, such as base stations, network controllers, etc., or they may be integrated into a single wireless network.

The communication subsystem 1811 is used to communicate with the voice and data network 1819, and includes the receiver 1812, the transmitter 1814, the one or more local oscillators 1813 and may also include the DSP 1820. The DSP 1820 is used to send and receive signals to and from the transmitter 1814 and receiver 1812, and is also utilized to receive control information from the transmitter 1814 and to provide control information to the receiver 1812. If the voice and data communications occur at a single frequency, or closely-spaced set of frequencies, then a single local oscillator 1813 may be used in conjunction with the transmitter 1814 and receiver 1812. Alternatively, if different frequencies are utilized for voice communications versus data communications, then a plurality of local oscillators 1813 can be used to generate a plurality of frequencies corresponding to the voice and data networks 1819. Although two antennas 1816, 1818 are depicted in FIG. 18, the mobile device 1810 could be used with a single antenna structure. Information, which includes both voice and data information, is communicated to and from the communication module 1811 via a link between the DSP 1820 and the microprocessor 1838. The detailed design of the communication subsystem 1811, such as frequency band, component selection, power level, etc., will be dependent upon the communication network 1819 in which the device is intended to operate. For example, a device 1810 intended to operate in a North American market may include a communication subsystem 1811 designed to operate with the Mobitex™ or DataTAC™ mobile data communication networks and also designed to operated with any of a variety of voice communication networks, such as AMPS, TDMA, CDMA, PCS, etc., whereas a device 1810 intended for use in Europe may be configured to operate with the General Packet Radio Service (GPRS) data communication network and the GSM voice communication network. Other types of data and voice networks, both separate and integrated, may also be utilized with the mobile device 1810.

Depending upon the type of network 1819 (or networks), the access requirements for the dual-mode mobile device 1810 may also vary. For example, in the Mobitex and DataTAC data networks, mobile devices are registered on the network using a unique identification number associated with each device. In GPRS data networks, however, network access is associated with a subscriber or user of a device 1810. A GPRS device typically requires a subscriber identity module ("SIM"), which is required in order to operate the device 1810 on a GPRS network. Local or non-network communication functions (if any) may be operable, without the SIM device, but the device 1810 will be unable to carry out any functions involving communications over the data network 1819, other than any legally required operations, such as 91811 emergency calling.

After any required network registration or activation procedures have been completed, the dual-mode device 1810 may the send and receive communication signals, including both voice and data signals, over the network 1819 (or networks). Signals received by the antenna 1816 from the communication network 1819 are routed to the receiver 1812, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 1820. In a similar manner, signals to be transmitted to the network 1819 are processed, including modulation and encoding, for example, by the DSP 1820 and are then provided to the transmitter 1814 for digital to analog conversion, frequency up conversion, filtering, amplification and transmission to the communication network 1819 (or networks) via the antenna 1818. Although a single transceiver 1811 is shown in FIG. 18 for both voice and data communications, it is possible that the device 1810 may include two distinct transceivers, a first transceiver for transmitting and receiving voice signals, and a second transceiver for transmitting and receiving data signals.

In addition to processing the communication signals, the DSP 1820 also provides for receiver and transmitter control. For example, the gain levels applied to communication signals in the receiver 1812 and transmitter 1814 may be adaptively controlled through automatic gain control algorithms implemented in the DSP 1820. Other transceiver control algorithms could also be implemented in the DSP 1820 in order to provide more sophisticated control of the transceiver 1811.

The microprocessor 1838 preferably manages and controls the overall operation of the dual-mode mobile device 1810. Many types of microprocessors or microcontrollers could be used here, or, alternatively, a single DSP 1820 could be used to carry out the functions of the microprocessor 1838. Low-level communication functions, including at least data and voice communications, are performed through the DSP 1820 in the transceiver 1811. Other, high-level communication applications, such as a voice communication application 1824A, and a data communication application 1824B may be stored in the Flash memory 1824 for execution by the microprocessor 1838. For example, the voice communication module 1824A may provide a high-level user interface operable to transmit and receive voice calls between the dual-mode mobile device 1810 and a plurality of other voice devices via the network 1819. Similarly, the data communication module 1824B may provide a high-level user interface operable for sending and receiving data, such as e-mail messages, files, organizer information, short text messages, etc., between the dual-mode mobile device 1810 and a plurality of other data devices via the network 1819.

The microprocessor 1838 also interacts with other device subsystems, such as the display 1822, Flash memory 1824, random access memory (RAM) 1826, auxiliary input/output (I/O) subsystems 1828, serial port 1830, keyboard 1832, speaker 1834, microphone 1836, a short-range communications subsystem 1840 and any other device subsystems generally designated as 1842.

Some of the subsystems shown in FIG. 18 perform communication-related functions, whereas other subsystems may provide "resident" or on-device functions. Notably, some subsystems, such as keyboard 1832 and display 1822 may be used for both communication-related functions, such as entering a text message for transmission over a data communication network, and device-resident functions such as a calculator or task list or other PDA type functions.

Operating system software used by the microprocessor 1838 is preferably stored in a persistent store such as Flash memory 1824. In addition to the operation system, which controls all of the low-level functions of the device 1810, the Flash memory 1824 may include a plurality of high-level software application programs, or modules, such as a voice communication module 1824A, a data communication module 1824B, an organizer module (not shown), or any other type of software module 1824N. The Flash memory 1824 also may include a file system for storing data. These modules are executed by the microprocessor 1838 and provide a high-level interface between a user of the device and the device. This interface typically includes a graphical component provided through the display 1822, and an inpuvoutput component provided through the auxiliary I/O 1828, keyboard 1832, speaker 1834, and microphone 1836. The operating system, specific device applications or modules, or parts thereof, may be temporarily loaded into a volatile store, such as RAM 1826 for faster operation. Moreover, received communication signals may also be temporarily stored to RAM 1826, before permanently writing them to a file system located in the persistent store 1824.

An exemplary application module 1824N that may be loaded onto the dual-mode device 1810 is a personal information manager (PIM) application providing PDA functionality, such as calendar events, appointments, and task items. This module 1824N may also interact with the voice communication module 1824A for managing phone calls, voice mails, etc., and may also interact with the data communication module for managing e-mail communications and other data transmissions. Alternatively, all of the functionality of the voice communication module 1824A and the data communication module 1824B may be integrated into the PIM module.

The Flash memory 1824 preferably provides a file system to facilitate storage of PIM data items on the device. The PIM application preferably includes the ability to send and receive data items, either by itself, or in conjunction with the voice and data communication modules 1824A, 1824B, via the wireless network 1819. The PIM data items are preferably seamlessly integrated, synchronized and updated, via the wireless network 1819, with a corresponding set of data items stored or associated with a host computer system, thereby creating a mirrored system for data items associated with a particular user.

The mobile device 1810 may also be manually synchronized with a host system by placing the device 1810 in an interface cradle, which couples the serial port 1830 of the mobile device 1810 to the serial port of the host system. The serial port 1830 may also be used to enable a user to set preferences through an external device or software application, or to download other application modules 1824N for installation. This wired download path may be used to load an encryption key onto the device, which is a more secure method than exchanging encryption information via the wireless network 1819.

Additional application modules 1824N may be loaded onto the dual-mode device 1810 through the network 1819, through an auxiliary I/O subsystem 1828, through the serial port 1830, through the short-range communications subsystem 1840, or through any other suitable subsystem 1842, and installed by a user in the Flash memory 1824 or RAM 1826. Such flexibility in application installation increases the functionality of the device 1810 and may provide enhanced on-device functions, communication-related functions, or both. For example, secure communication applications may enable electronic commerce functions and other such financial transactions to be performed using the device 1810.

When the dual-mode device 1810 is operating in a data communication mode, a received signal, such as a text message or a web page download, will be processed by the transceiver 1811 and provided to the microprocessor 1838, which will preferably further process the received signal for output to the display 1822, or, alternatively, to an auxiliary I/O device 1828. A user of dual-mode device 1810 may also compose data items, such as email messages, using the keyboard 1832, which is preferably a complete alphanumeric keyboard laid out in the QWERTY style, although other styles of complete alphanumeric keyboards such as the known DVORAK style may also be used. User input to the device 1810 is further enhanced with a plurality of auxiliary I/O devices 1828, which may include a thumbwheel input device, a touchpad, a variety of switches, a rocker input switch, etc. The composed data items input by the user may then be transmitted over the communication network 1819 via the transceiver 1811.

When the dual-mode device 1810 is operating in a voice communication mode, the overall operation of the device 1810 is substantially similar to the data mode, except that received signals are preferably be output to the speaker 1834 and voice signals for transmission are generated by a microphone 1836. Alternative voice or audio I/O subsystems, such as a voice message recording subsystem, may also be implemented on the device 1810. Although voice or audio signal output is preferably accomplished primarily through the speaker 1834, the display 1822 may also be used to provide an indication of the identity of a calling party, the duration of a voice call, or other voice call related information. For example, the microprocessor 1838, in conjunction with the voice communication module and the operating system software, may detect the caller identification information of an incoming voice call and display it on the display 1822.

A short-range communications subsystem 1840 may also be included in the dual-mode device 1810. For example, the subsystem 1840 may include an infrared device and associated circuits and components, or a Bluetooth™ short-range wireless communication module to provide for communication with similarly-enabled systems and devices.

A content converter and corresponding content provider according to aspects of the invention are thereby adaptable to support new features by defining new behavior sequencers and behaviors at a content converter and processing rules for executing such sequencers and behaviors at a content processor. It should therefore be appreciated that the above example sequencers and behaviors are presented for illustrative purposes only, and that the invention is in no way restricted thereto.

It will be appreciated that the above description relates to preferred embodiments by way of example only. Many variations on the invention will be obvious to those knowledgeable in the field, and such obvious variations are within the scope of the invention as described, whether or not expressly described.

For example, although the systems and methods according to aspects of the invention as described herein are particularly suited to media devices, the content size and processing requirement reductions may also be advantageous in other systems such as desktop computer systems and the like in which memory and processing resources are not as limited as in media devices. Smaller file sizes and less intensive processing results in faster content transfer and display.

It should also be appreciated that content converters and processors are not dependent upon any particular communication networks, systems or protocols. As such, content converters and processors in accordance with the present invention may be implemented in virtually any one-way or two-way communication device. Communication-related dependencies would be addressed in the communication subsystems in content provider systems and devices.

Although only two media devices and one wireless network, gateway, WAN and content provider system have been shown in the drawings, it will be obvious that a communication system will normally include many such components. A content provider system may be configured to communicate with multiple gateways and different wireless networks, possibly through different types of connections to different gateways. Each wireless network normally includes multiple gateways and provides communication services to thousands or even millions of devices, any or all of which may be enabled for communications with one or more content provider systems.

Furthermore, aspects of the invention are described above in the context of SVG as the format of content at a content provider system, but other data formats in XML and non-XML formats may be used without departing from the scope of the present invention.

Similarly, a content provider system may include content in different formats and have multiple content converters for converting each type of content. It is also possible that a content provider system may provide content to systems, which do not implement a media engine according to the present invention. This may be achieved for example by forwarding content to a destination without first converting the content.

It is contemplated that devices such as Device 105 to which converted content may be sent by a content provider system generally cannot support all elements and functions of SVG, due primarily to their limited memory and processing resources. Two smaller SVG profiles, SVG Basic and SVG Tiny, are tailored to different classes of device. Depending upon which of these SVG profiles, or possibly some other limited or modularized SVG profile, is supported by a destination media device, the Converter 210 filters and either ignores or discards unsupported elements. The Converter 210 may be configured to assume a particular profile and set of supported elements for all devices, or may instead be controlled to filter the DOM from the SVG Reader 300 based on device information, in a content provider system device profile database or in a content request from a device for example. The function of filtering the content may instead be implemented in the SVG Reader 300, wherein unsupported SVG elements are discarded or ignored when building a DOM.

A Content Provider System 125 may also include other elements and support other functions than those shown explicitly in the drawings and described above. In conjunction with the SVG Converter 210 for example, further modules may be installed at a Content Provider System 125 to support such functions as: (1) user identity determination and authentication, (2) personalization, to allow each user to specify what and how content should be forwarded to them by the Content Provider System 125, for example in a user profile stored at the Content Provider System 125 instead of in each content request, (3) secure mobile commerce, allowing secure financial transactions to occur via the content converter and processor via Secure HyperText Transfer Protocol (HTTPS) for example, (4) dynamic data feeds, allowing third-party data such as maps, stock quotes or news clippings to be dynamically pushed to a device through a content converter, and (5) chat and other messaging services, using the Content Provider System 125 to device communication functionality to transport messages. Further advanced services may similarly be developed to enhance the overall user experience.

TABLE A

The following text is an exemplary specification for the binary format.
The general stream layout is described first, followed by the specific stream format of the specific nodes. All size values are represented in Big-Endian format (high byte first). Where specific bits are referred to by number the most significant bit will be numbered 7 and the least significant bit numbered 0. Values that are unsigned are strictly positive values.
Each field is specified in the following format:
<name> <Java Primitive> <Byte size> <Shortened according to candidate number>
The candidate number is defined in the narrowing bytes, which are explained below.
General Format:
BF start header                int                (4 bytes)
    This value serves to indicate that the stream is a valid BF stream and not a text or other stream. This contains the character bytes: '211' 'P' 'M' 'E'. The first character is non-text to reduce the chance a text stream will be interpreted as a BF. The remaining three bytes are so the file can be identified if opened in a text editor.
BF major version 1            byte             (1 byte)
    This value is currently not used.
BF major version 2            byte             (1 byte)
    This value indicates the major release associated with the stream. Media engines may optionally play streams of a lesser version (backward comaptibility) but are not required to play streams of a greater version (forward compatibility). When a new generation of product is released, this version should be incremented.
BF minor version 1            byte             (1 byte)
    This value indicates a minor release of the stream format. Media engines within a given major version must be backward compatible with any minor version, but not necessarily forward compatible with minor version 1 revisions. When the stream format is upgraded this version should be incremented.
BF minor version 2            byte             (1 byte)
    This value indicates the version of the media engine within a generation designed to play this stream. Media engines within a given minor 1 revision must be forward and backward compatible with this version. This version should be incremented whenever a change is made to the stream format that will not affect the Media Engine's ability to play the new version of the stream.
    Footnote regarding version information: There was some debate as to whether or not the version information should be encoded as text or as bytes. If it is encoded as text based characters, anyone opening the BF file in a text editor can see what version it is. This would also however limit each version identifier to the characters 0–9.
BF end header                  int                (4 bytes)
    This value is used to catch file transfer errors early on. It consists of the characters: '\r' '\n' '32' '\n'. The carriage return/line feed combination will be caught as an error by text based file transfer mechanisms. Please note that the start and end headers are based on the PNG file format headers.
    (http://www.w3.org/TR/REC-png.html#R.PNG-file-signature).

TABLE A-continued

Encoding    utf-8
    This is the text string that represents the encoding that was used to encode all
    remaining strings in the stream. This value is not included in the checksums.
Scene title
    This is the title of the scene. The content developer can optionally specifiy this field.
    It has a maximum length of 16 characters. This limit should be enforced by the
    compiler or output stream as no check is guarenteed at the time of de-serialization.
Copyright information
    This is an optional field that may contain copyright information specified by the
    content developer. It has a maximum length of 80 characters. This limit should also
    be enforced by the compiler or output stream.
Narrowing bytes    int    (4 bytes)
    This field contains a sequence of bitmasks that will allow certain sets of variables to
    be written with a minimum number of bytes. The values for the set will be written in
    the fewest number of bytes necessary to represent the maximum value contained in
    that set. The following table shows the boundary values that will be
    used to determine the number of bytes. An unsigned set is a set in which negative
    values have no meaning, such as array indices. A signed set is a set in which both
    negative and positive values have meaning. If all the values of a signed set are
    positive, then it is allowed to be treated as an unsigned set.

| Byte Size | Unsigned Minimum | Unsigned Maximum | Bit Mask | Signed Minimum | Signed Maximum | Bit Mask |
|---|---|---|---|---|---|---|
| 1 byte (byte) | 0 | 255 | 000 | −128 | 127 | 100 |
| 2 bytes (short) | 0 | 65535 | 001 | −32768 | 32767 | 101 |
| 3 bytes | 0 | 16777215 | 010 | not used | | 110 |
| 4 bytes (int) | 0 | 2147483647(*) | 011 | not used | | 111 |

(*)This is the maximum value that can be represented as a signed 4 byte number.
This is restricted to allow possible optimizations to the input stream.
Narrowing will be applied by setting a bitmask at a specific location in the 4 bytes (32
bits) allocated for the field. Since it is only possible for the first 7 candidates to be
either the type unsigned byte or unsigned short, only the last bit of the bit mask needs
to be written to the stream. The leading 0's can be added to the mask when the stream
is de-serialized. By the same reasoning, since the key times can never be signed, the
leading 0 of the bit mask is dropped and only 2 bits are written to the stream.

| Candidate # | Set | Max size of Value | Signed/ Unsigned | Bit position |
|---|---|---|---|---|
| 1 | Indices into object array | 2 bytes | Unsigned | 24 |
| 2 | Indices into coordinate array | 2 bytes | Unsigned | 23 |
| 3 | Length of Variable data | 2 bytes | Unsigned | 22 |
| 4 | Loop Count variables | 2 bytes | Unsigned | 21 |
| 5 | Scene/Rectangle Width & Height | 2 bytes | Unsigned | 20 |
| 6 | Indices into key times array | 2 bytes | Unsigned | 19 |
| 7 | Indices into key values array | 2 bytes | Unsigned | 18 |
| 8 | Indices into channels array | 2 bytes | Unsigned | 17 |
| 9 | Key Time values | 4 bytes | Unsigned | 15–16 |
| 10 | Key Value values | 2 bytes | Signed | 12–14 |
| 11 | Coordinate Values | 2 bytes | Signed | 9–11 |
| 12 | Current Child of Group | 2 bytes | Signed | 6–8 |
| 13 | X coordinate of a visual node | 2 bytes | Signed | 3–5 |
| 14 | Y coordinate of a visual node | 2 bytes | Signed | 0–2 |

Scene width    byte/short    (1 byte/2 bytes) (#5)
Scene height    byte/short    (1 byte/2 bytes) (#5)
    This is the preferred width and height of the scene. It will be used to center the scene
    on the device screen.
Scene color - R    unsigned byte    (1 byte)
Scene color - G    unsigned byte    (1 byte)
Scene color - B    unsigned byte    (1 byte)
    This is the background color of the scene in RGB form. If the device screen is larger
    than the scene width and height this color will be used for matting purposes.
Sequence root index    unsigned short    (2 bytes)
    The index into the nodes array of the sequence graph root node. The index of the
    visual graph is not written as it will always be 0.
node data size    unsigned short    (2 bytes)
    The number of elements in the nodes array. This is not the number of nodes in the
    array, rather the number of ints that will need to be allocated. This number includes
    spaces for transient data.

TABLE A-continued

| | | |
|---|---|---|
| Key times data size | unsigned short | (2 bytes) |
| Key values data size | unsigned short | (2 bytes) |

These values are written together here to allow for the possibility that the key times and key values are stored in a single array. In this case the engine will need to add the key times data size to all key value indices found in the nodes array.

numCoordinateArrays     unsigned byte/unsigned short (1 byte/2 bytes) (#2)
    The number of coordinate arrays to read.
numObjects     unsigned byte/unsigned short (1 byte/2 bytes) (#1)
    This is the number of media url references, hyperlink references, and text strings contained in the objects array.
numSounds     unsigned byte/unsigned short (1 byte/2 bytes) (#1)
numImages     unsigned byte/unsigned short (1 byte/2 bytes) (#1)
    Provided for convenience, this is the number of sound urls and image urls respectively, contained in the objects array.
numInterpolators     unsigned short     (2 bytes)
    The number of interpolator nodes contained in the nodes array.
numHotspots     unsigned short     (2 bytes)
    The number of hotspot nodes contained in the nodes array.
channel datasize     unsigned short     (2 bytes)
    The data size of the channels array.
checksum     int     (4 bytes)
    This will be a value calculated from the bytes of the stream, up to but not including the bytes of this checksum and the file header. The value is the simple sum of all values written to the stream. If this value is not correct, the engine should abort the load as the stream has been altered or an error has occured during transmission of the stream.
nodes array
    The data for each node in the visual graph followed by each node in the sequence graph. The information is written as a pre-order depth-first traversal to allow for the future possibility of streaming. Preorder means the parent is written before the child. Depth first means that the first child's sub graph is entirely written before the second child is written. For example: Root Group, Child 1 of Root Group, Child 1 of Child 1 of Root Group, ...
checksum     int     (4 bytes)
    This will be a value calculated from the bytes of the stream, up to but not including the bytes of this checksum, any previous checksum or the file header. The value is the simple sum of all values written to the stream. If this value is not correct, the engine should abort the load as the stream has been altered or an error has occured during transmission of the stream.
Coordinate arrays:
    This is the coordinate data for all the polygons/polylines in the scene. The following data will be written to the stream for each coordinate array:
        length     unsigned byte/unsigned short (1 byte/2 bytes) (#3)
        each x or y value     byte/short ((1 byte/2 bytes) * length) (#11)
    It is expected that the engine will store these in an int[ ][ ] due to the nature of the docomo graphics API. x and y are not distinguished here. They are distinguished only on the render call by the index in the polygon object. If a set of coordinates will be animated, the set will not be shared unless that is the desired effect. Rather it will be written to the stream as a separate coordinate set. The compiler or output stream will be responsible for determining if the coordinate array should be shared.
checksum     int     (4 bytes)
    This will be a value calculated from the bytes of the stream, up to but not including the bytes of this checksum, any previous checksum or the file header. The value is the simple sum of all values written to the stream. If this value is not correct, the engine should abort the load as the stream has been altered or an error has occured during transmission of the stream.
Keytimes array
    This is the array for all the key times of the interpolators in the scene. The following data will be written to the stream for each key time array:
        length     unsigned byte/unsigned short (1 byte/2 bytes) (#3)
        each key time     unsigned byte/unsigned short/
                                      unsigned 3 bytes/unsigned int
                                      ((1 byte/2 bytes/3 bytes/4 bytes) * length) (#9)
    The first key time of 0 will not be written to the stream. Rather the engine should initialize it at the time of de-serialization.
checksum     int     (4 bytes)
    This will be a value calculated from the bytes of the stream, up to but not including the bytes of this checksum, any previous checksum or the file header. The value is the simple sum of all values written to the stream. If this value is not correct, the engine should abort the load as the stream has been altered or an error has occured during transmission of the stream.
Key values array
    This is the associated key values arrays for all interpolators in the scene. Because these arrays may be shared, the data size may differ from the key times. If the key value array will be animated then it will not be shared unless that is the desired effect. In that case will be written as a separate key value array. The compiler or output stream will be responsible for determining if the key value array should be shared. The following data will be written to the stream for each key value array.
        length     unsigned byte/unsigned short (1 byte/2 bytes) (#3)
        each key value     byte/short ((1 byte/2 bytes) * length) (#10)

TABLE A-continued checksum               int                    (4 bytes)
    This will be a value calculated from the bytes of the stream, up to but not including
    the bytes of this checksum, any previous checksum or the file header. The value is
    the simple sum of all values written to the stream. If this value is not correct, the
    engine should abort the load as the stream has been altered or an error has occurred
    during transmission of the stream.
String/Media Objects array
    This array contains the urls for image, audio clip and hyperlink nodes. It also
    contains the text strings from any text node. The data will be written in the following
    order: all audio clip urls, all image urls, all text strings, all hyperlinks.
    *If this is allocated as an Object[ ] on the engine side then the MediaResource object
    can be overwrite the URL at the appropriate index.
checksum               int                    (4 bytes)
    This will be a value calculated from the bytes of the stream, up to but not including
    the bytes of this checksum, any previous checksum or the file header. The value is
    the simple sum of all values written to the stream. If this value is not correct, the
    engine should abort the load as the stream has been altered or an error has occured
    during transmission of the stream.
channel data
    This is the channels of the scene. The following data will be written for all channels
    in the stream:
        length              unsigned byte/unsigned short (1 byte/2 bytes) (#3)
        each channel index  unsigned short (2 bytes * length)
checksum               int                    (4 bytes)
    This will be a value calculated from the bytes of the stream, up to but not including
    the bytes of this checksum, any previous checksum or the file header. The value is
    the simple sum of all values written to the stream. If this value is not correct, the
    engine should abort the load as the stream has been altered or an error has occurred
    during transmission of the stream.
Format of Specific Nodes:
(*) values are transient and will not be written to the stream. They will be allocated and
assigned initial values by the engine at the time the stream is de-serialized. All nodes will
have a bits field. Within that byte the following meanings have been assigned to the bit
positions:

| | |
|---|---|
| Visible | 7 |
| Has Stroke | 6 |
| Has Fill | 5 |
| Active | 4 |
| Finished | 3 |
| Loop | 2 |
| Notify | 1 |

Since nodes will be read on a type by type basis there must be no name space collisions on
the node type between sequence and visual nodes. Visual node types will start at type 1 and
increment to 64. Sequence node types start at Byte.MAX_VALUE (127) and decrement to
65.
One's Complement (~) will be used to indicate visibility of those nodes in which the visibile
bit is the only bit in the Bits field. Specifically these nodes are: Interpolator, Hotspot, Group,
Image and Text. The Bits field for the listed nodes will not be written. Instead, if the node is
visible, the normal type constant is written to the stream. If the node is not visible, the one's
complement of the type is written to the stream.
Bits Fields that are marked with a P indicate that the visibility is packed in the type identifier.
Type Identifiers:

| | |
|---|---|
| Rectangle | 10 |
| Polyline/Polygon | 20 |
| Text | 30 |
| Image | 40 |
| Group | 50 |
| Loop | 125 |
| All-fork | 120 |
| Any-fork | 115 |
| Hotspot | 110 |
| Audioclip | 105 |
| Audiostop | 100 |
| Hyperlink | 95 |
| Channel Modifier | 90 |
| Interpolator | 85 |

Sequence Nodes:
Audioclip:
    type:                byte                   (1 byte)
    Bits:                unsigned byte          (1 byte)
        Loop
        Notify
    *parent
    media index          unsigned byte/unsigned short (1 byte/2 bytes) (#1)

TABLE A-continued

```
Audiostop:
    Type:                       byte                                    (1 byte)
    *Bits: (future use)
    *parent:
Channel Modifier:
    Type:                       byte                                    (1 byte)
    *Bits: (future use)
    *Parent:
    channel index:              unsigned byte/unsigned short (1 byte/2 bytes) (#8)
    operation:                  byte                                    (1 byte)
Hyperlink:
    Type                        byte                                    (1 byte)
    *Bits: (future use)
    *Parent:
    Link index:                 unsigned byte/unsigned short (1 byte/2 bytes) (#1)
Interpolator:
    Type:                       byte                                    (1 byte)
    P Bits:                     unsigned byte                           (1 byte)
        Visible:
        *Active:
    *Parent:
    loopcount                   unsigned byte/unsigned short (1 byte/2 bytes) (#4)
    Interpolatation type        byte                                    (1 byte)
    Index of Key times          unsigned byte/unsigned short (1 byte/2 bytes) (#6)
    Index of Key values         unsigned byte/unsigned short (1 byte/2 bytes) (#7)
    *startTime
    *interval
    Number of setValue targets  unsigned byte/unsigned short (1 byte/2 bytes) (#3)
    Indices for setValue        unsigned short              (2 bytes * Number of targets)
    As opposed to having a set value method, the index to write the value to will be
    directly specified in the interpolator. This will tie the format closely to the int array
    format media engine as it indexes the location of the field in the nodes array. The
    gain is that this will allow the removal the set value method and set value identifiers.
    It would be possible to reconstruct this information in an object version of the engine
    if the indices of each node are tracked upon deserialization and matched when the
    interpolator is de-serialized. If the interpolator has a null target for the set value, the
    index should not be written to the stream.
Hotspot:
    Type:                       byte                                    (1 byte)
    P Bits:                     unsigned byte                           (1 byte)
        Visible:
        *Active:
    *Parent:
    index of the outfocus child    unsigned short                       (2 bytes)
    index of the infocus child     unsigned short                       (2 bytes)
    index of the onactivate        unsigned short                       (2 bytes)
        child
Anyfork:
    Type:                       byte                                    (1 byte)
    *Bits:
        *Finished:
    *Parent:
    numChildren:                unsigned byte/unsigned short (1 byte/2 bytes) (#3)
    Indices of children:        unsigned short              (2 bytes * numChildren)
Allfork
    Type:                       byte                                    (1 byte)
    *Bits: (future use)
    *Parent:
    numChildren                 unsigned byte/unsigned short (1 byte/2 bytes) (#3)
    Indices of children:        unsigned short              (2 bytes * numChildren)
Loop:
    Type:                       byte                                    (1 byte)
    *Bits: (future use)
    *Parent:
    numChildren                 unsigned byte/unsigned short (1 byte/2 bytes) (#3)
    LoopCount                   unsigned byte/unsigned short (1 byte/2 bytes) (#4)
    *CurrentChild
    *CurrentLoop
    Indices of children:        unsigned short (2 bytes * numChildren)
Visual Nodes:
Rectangle:
    Type                        byte                                    (1 byte)
    Bits:                       unsigned byte                           (1 byte)
        Visible
        Has Stroke
        Has Fill
    X                           byte/short              (1 byte/2 bytes)  (#13)
    Y                           byte/short              (1 byte/2 bytes)  (#14)
    Fill Color - Red (if applicable)      unsigned byte (1 byte)
    Fill Color - Green (if applicable)    unsigned byte (1 byte)
```

TABLE A-continued

| | | |
|---|---|---|
| Fill Color - Blue (if applicable) | unsigned byte (1 byte) | |
| Stroke Color - Red (if applicable) | unsigned byte (1 byte) | |
| Stroke Color - Green (if applicable) | unsigned byte (1 byte) | |
| Stroke Color - Blue (if applicable) | unsigned byte (1 byte) | |
| Width | unsigned byte/unsigned short (1 byte/2 bytes) | |
| Height | unsigned byte/unsigned short (1 byte/2 bytes) | |
| Polygon/Polyline: | | |
|   Type | byte | (1 byte) |
|   Bits: | unsigned byte (1 byte) | |
|     Visible | | |
|     Has Stroke | | |
|     Has Fill | | |
|   X | byte/short | (1 byte/2 bytes) (#13) |
|   Y | byte/short | (1 byte/2 bytes) (#14) |
|   Fill Color - Red (if applicable) | unsigned byte (1 byte) | |
|   Fill Color - Green (if applicable) | unsigned byte (1 byte) | |
|   Fill Color - Blue (if applicable) | unsigned byte (1 byte) | |
|   Stroke Color - Red (if applicable) | unsigned byte (1 byte) | |
|   Stroke Color - Green (if applicable) | unsigned byte (1 byte) | |
|   Stroke Color - Blue (if applicable) | unsigned byte (1 byte) | |
|   x coord index | unsigned byte/unsigned short (1 byte/2 bytes) (#2) | |
|   y coord index | unsigned byte/unsigned short (1 byte/2 bytes) (#2) | |
| Text: | | |
|   Type | byte | (1 byte) |
|   P Bits: | unsigned byte | (1 byte) |
|     Visible | | |
|   X | byte/short | (1 byte/2 bytes) (#13) |
|   Y | byte/short | (1 byte/2 bytes) (#14) |
|   Color - Red | unsigned byte (1 byte) | |
|   Color - Green | unsigned byte (1 byte) | |
|   Color - Blue | unsigned byte (1 byte) | |
|   font | int | (4 bytes) |
|   text index | unsigned byte/unsigned short (1 byte/2 bytes) (#1) | |
| To support stroke and fill in a text node, each character would need to be converted to an equivalent polyline. This option is not include in this version, as a result only fill is supported. | | |
| Image | | |
|   Type | byte | (1 byte) |
|   P Bits: | unsigned byte | (1 byte) |
|     Visible | | |
|   X | byte/short | (1 byte/2 bytes) (#13) |
|   Y | byte/short | (1 byte/2 bytes) (#14) |
|   image index | unsigned byte/unsigned short (1 byte/2 bytes) (#1) | |
| Group | | |
|   Type | byte | (1 byte) |
|   P Bits: | unsigned byte | (1 byte) |
|     Visible | | |
|   X | byte/short | (1 byte/2 bytes) (#13) |
|   Y | byte/short | (1 byte/2 bytes) (#14) |
|   currentChild | byte/short | (1 byte/2 bytes) (#12) |
|   numChildren | unsigned byte/unsigned short (1 byte/2 bytes) (#3) | |
|   child indices | unsigned short (2 bytes) | |

TABLE B

| Elements Attributes | a | animate | animateTransf | audioclip* | audiostop* | desc | g | image | line | loadScene* |
|---|---|---|---|---|---|---|---|---|---|---|
| attributeName | | X | X | | | | | | | |
| begin (partial) | | X | X | X | X | | | | | X |
| by (partial) | | X | Y | | | | | | | |
| calcMode (partial) | | X | X | | | | | | | |
| currentChild* | | | | | | | | | | |
| d (partial) | | | | | | | | | | |
| dur | | X | X | | | | | | | |
| fill | Y | Y | Y | | | | Y | Y | Y | |
| font-size | | | | | | | | | | |
| from (partial) | | X | Y | | | | | | | |
| height | | | | | | | | Y | | |
| id | X | X | X | X | X | X | X | X | X | X |
| keyTimes | | X | X | | | | | | | |
| loop* | | | | X | | | | | | |
| points | | | | | | | | | | |
| repeatCount | | X | X | | | | | | | |
| stroke | Y | | | | | | Y | Y | X | |

TABLE B-continued

|  | | | | | | | | | |
|---|---|---|---|---|---|---|---|---|---|
| style (partial) | Y | | | | | | Y | Y | X |
| to (partial) | | X | | Y | | | | | |
| transform | Y | | | | | | X | Y | X |
| type (partial) | | | X | | | | | | |
| values | | X | X | | | | | | |
| visibility | Y | | | | | | X | X | X |
| width | | | | | | | | Y | |
| xlink:href | X | X | X | X | | | X | | X |
| x | | | | | | | Y | X | |
| x1 | | | | | | | | | X |
| x2 | | | | | | | | | X |
| y | | | | | | | Y | X | |
| y1 | | | | | | | | | X |
| y2 | | | | | | | | | X |

| Elements Attributes | path | pict** | polygon | polyline | rect | svg | switchGroup* | text | title |
|---|---|---|---|---|---|---|---|---|---|
| attributeName | | | | | | | | | |
| begin (partial) | | | | | | | | | |
| by (partial) | | | | | | | | | |
| calcMode (partial) | | | | | | | | | |
| currentChild* | | | | | | | X | | |
| d (partial) | X | | | | | | | | |
| dur | | | | | | | | | |
| fill | X | | X | X | X | | | X | |
| font-size | | | | | | | | X | |
| from (partial) | | | | | | | | | |
| height | | | | | X | X | | | |
| id | X | | X | X | X | X | X | X | X |
| keyTimes | | | | | | | | | |
| loop* | | | | | | | | | |
| points | | | X | X | | | | | |
| repeatCount | | | | | | | | | |
| stroke | X | | X | X | X | | | X | |
| style (partial) | X | | X | X | X | | | X | |
| to (partial) | | | | | | | | | |
| transform | X | | X | X | Y | | X | Y | |
| type (partial) | | | | | | | | | |
| values | | | | | | | | | |
| visibility | X | | X | X | X | | X | X | |
| width | | | | | X | X | | | |
| xlink:href | | | | | | | | | |
| x | | | X | Y | | | | X | |
| x1 | | | | | | | | | |
| x2 | | | | | | | | | |
| y | | | X | Y | | | | X | |
| y1 | | | | | | | | | |
| y2 | | | | | | | | | |

*denotes an extension to SVG
**Note: The "pict" element must be used as a child of the text attribute; otherwise it will be ignored by the SVG Compiler.
Legend:
blank is not supported by SVG
Y is supported by SVG, but not by this implementation
X is supported by SVG and this implementation It is claimed:

1. A method of rendering rich content on a media device, the method comprising:
   receiving, from a server, the rich content comprising visual elements and behavior elements;
   separating the rich content into the visual elements and behavior elements;
   displaying a first scene based at least on the visual elements; and
   displaying a revised animated scene based at least in part on the first scene in response to user input interaction, wherein the revised scene is based at least on the behavior elements comprising an animation speed and interpolation.

2. The method of claim 1 wherein the user input interaction further comprises initiation of a hotspot associated with the first scene.

3. The method of claim 2 further comprising playing an audio clip in response to the initiation of the hotspot.

4. The method of claim 1 further comprising stopping the playing of the audio clip when another user input interaction with a hotspot is detected.

5. The method of claim 1 wherein the visual elements include at least one of text, lines, color and shapes.

6. The method of claim 1 wherein the behavior elements include at least one of color changes and position changes.

7. The method of claim 6 wherein the behavior elements include timing data for displaying the revised scene.

8. The method of claim 1 wherein the received rich content is in binary format.

9. The method of claim 8 further comprising storing the rich content in a data store in markup language.

10. The method of claim 9 wherein the markup language comprises one of Hypertext Markup Language, Extensible Markup Language, and Extensible Markup Language with Scalable Vector Graphics Language.

11. The method of claim 1 further comprising providing the server with device information and the received rich content is based at least on the device information.

12. A media device comprising
a display
a media engine configured to:
receive rich content comprises visual elements and behavior elements;
separating the rich content into the visual elements and behavior elements; and
receive user input interaction; and
a renderer, communicatively coupled to the display, and configured to:
display a first scene on the display, the first scene based at least on the visual elements;
display a revised animated scene on the display in response to user input interaction, the revised scene is based at least on the behavior elements comprising an animation speed and interpolation.

13. The media device of claim 12 wherein the renderer is further configured to initiate a hotspot associated with the first scene in response to user input interaction with the hotspot.

14. The media device of claim 13 wherein the renderer is further configured to play an audio clip in response to the initiation of the hotspot.

15. The media device of claim 12 wherein the renderer is further configured to process a hyperlink associated with the first scene in response to user input interaction with the first scene.

16. The media device of claim 12 wherein the renderer is further configured to stop the playing of the audio clip when another user input interaction with a hotspot is detected.

17. The media device of claim 12 wherein the visual elements include at least one of text, lines, color and shapes.

18. The media device of claim 12 wherein the behavior elements include at least one of color changes and position changes.

19. The media device of claim 18 wherein renderer is further configured to display the revised scene based on timing data associated with the behavior elements.

20. The media device of claim 12 wherein the received rich content is in binary format.

21. The media device of claim 12 wherein the media engine is further configured to store the rich content in a data store in markup language.

22. The media device of claim 21 wherein the markup language comprises one of Hypertext Markup Language, Extensible Markup Language, and Extensible Markup Language with Scalable Vector Graphics Language.

23. The media device of claim 12 wherein the media engine is further configured to provide the server with device information and the received rich content is based at least on the device information.

* * * * *